US012659943B2

(12) United States Patent
Li et al.

(10) Patent No.: US 12,659,943 B2
(45) Date of Patent: Jun. 16, 2026

(54) RESOURCE MAPPING METHOD AND COMMUNICATION APPARATUS

(71) Applicant: HUAWEI TECHNOLOGIES CO., LTD., Shenzhen (CN)

(72) Inventors: Ruijie Li, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 461 days.

(21) Appl. No.: 18/304,595

(22) Filed: Apr. 21, 2023

(65) Prior Publication Data

US 2023/0262679 A1      Aug. 17, 2023

Related U.S. Application Data

(63) Continuation of application No. PCT/CN2020/122424, filed on Oct. 21, 2020.

(51) Int. Cl.
*H04W 72/12* (2023.01)
*H04W 72/566* (2023.01)

(52) U.S. Cl.
CPC ......... *H04W 72/12* (2013.01); *H04W 72/569* (2023.01)

(58) Field of Classification Search
None
See application file for complete search history.

(56) References Cited

U.S. PATENT DOCUMENTS

2019/0357244 A1* 11/2019 Takeda .................. H04W 72/23
2021/0321414 A1* 10/2021 Yeo ....................... H04L 1/1896
2023/0291510 A1*  9/2023 Singh .................... H04L 1/1887

* cited by examiner

*Primary Examiner* — Mohammad S Adhami
(74) *Attorney, Agent, or Firm* — HAUPTMAN HAM, LLP

(57) ABSTRACT

A resource mapping method and a communication apparatus include a communication device that determines whether a first information block corresponds to one or more modulation symbols, and determines whether a second information block corresponds to one or more modulation symbols, where the first information block and the second information block are transmitted through a same physical channel, the first information block and the second information block correspond to a total of M modulation symbols, and the physical channel includes N spatial resources. The communication device maps the M modulation symbols to the N spatial resources, where N and M are integers greater than or equal to 2. The modulation symbols obtained by independently coding and modulating the different information blocks are mapped to the plurality of spatial resources of the physical channel.

20 Claims, 8 Drawing Sheets

S1201: A communication device receives one or more first modulation symbols and one or more second modulation symbols through a same physical channel, where the first modulation symbols are carried on a first resource of the physical channel, the second modulation symbols are carried on a second resource of the physical channel, and the first resource does not overlap the second resource S1202: The communication device obtains a first information block corresponding to the first modulation symbols and a second information block corresponding to the second modulation symbols Communication system 100

Network device 110

Terminal device 120

| d(0) | d(1) | d(2) | d(3) | | h(0) | h(1) | h(2) | h(3) | h(4) | h(5) |

Codeword 1

Codeword 2

| d(0) and d(2) | d(1) and d(3) | h(0) and h(3) | h(1) and h(4) | h(2) and h(5) |

Layer 0    Layer 1    Layer 2    Layer 3    Layer 4

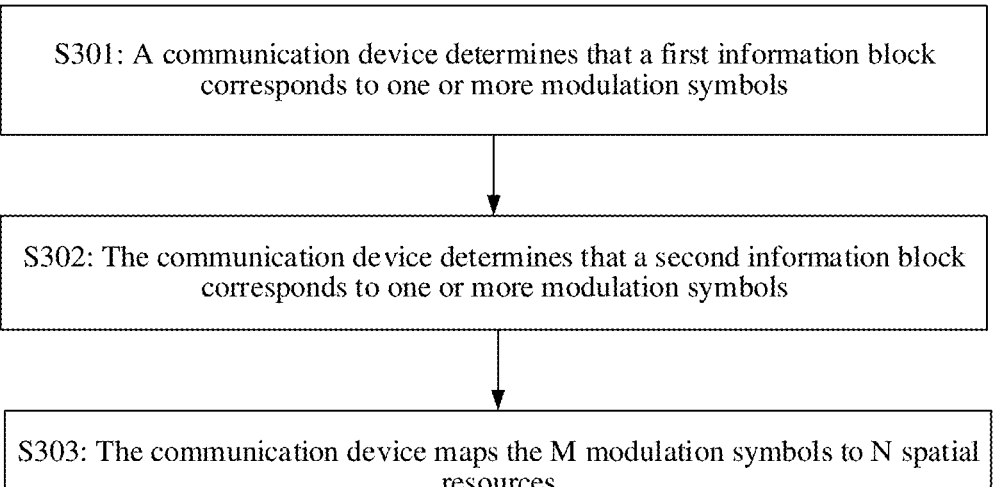

S301: A communication device determines that a first information block corresponds to one or more modulation symbols S302: The communication device determines that a second information block corresponds to one or more modulation symbols S303: The communication device maps the M modulation symbols to N spatial resources

FIG. 3

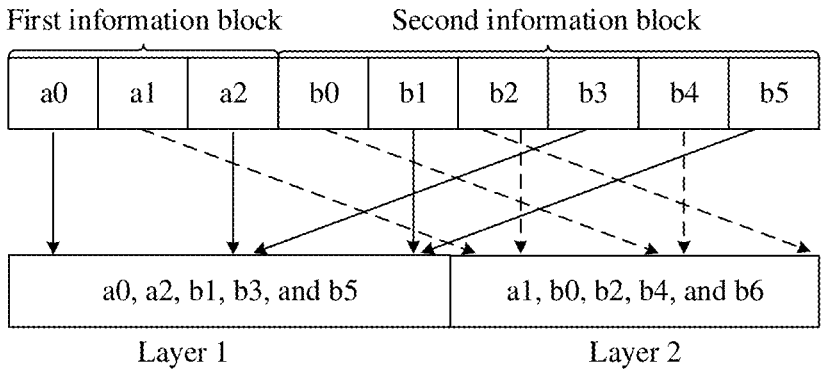

First information block          Second information block

| a0 | a1 | a2 | b0 | b1 | b2 | b3 | b4 | b5 |

| a0, a2, b1, b3, and b5 | a1, b0, b2, b4, and b6 |

Layer 1                    Layer 2

FIG. 4

First information block          Second information block

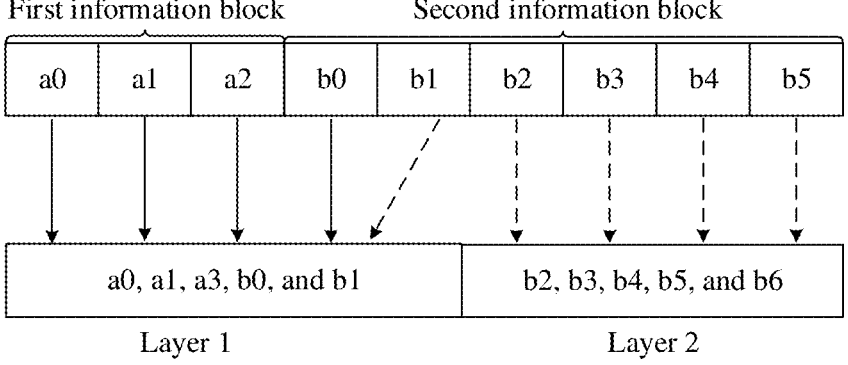

| a0 | a1 | a2 | b0 | b1 | b2 | b3 | b4 | b5 |

| a0, a1, a3, b0, and b1 | b2, b3, b4, b5, and b6 |

Layer 1                    Layer 2

FIG. 5

S601: A communication device determines that a first information block corresponds to one or more modulation symbols S602: The communication device determines that a second information block corresponds to one or more modulation symbols S603: The communication device maps the first modulation symbols to a first resource, and maps the second modulation symbols to a second resource, where the first resource does not overlap the second resource

FIG. 6

DMRS
* First information block
** Second information block

Frequency domain

| # | * | * | * | ** | ** | ** | ## | ** | ** | ** | ** |
| # | * | * | * | ** | ** | ** | ## | ** | ** | ** | ** |
| # | * | * | * | ** | ** | ** | ## | ** | ** | ** | ** |
| # | * | * | * | ** | ** | ** | ## | ** | ** | ** | ** |
| # | * | * | * | ** | ** | ** | ## | ** | ** | ** | ** |
| # | * | * | * | * | ** | ** | ## | ** | ** | ** | ** |
| # | * | * | * | ** | ** | ** | ## | ** | ** | ** | ** |
| # | * | * | * | ** | ** | ** | ## | ** | ** | ** | ** |
| # | * | * | * | ** | ** | ** | ## | ** | ** | ** | ** |
| # | * | * | * | ** | ** | ** | ## | ** | ** | ** | ** |
| # | * | * | * | ** | ** | ** | ## | ** | ** | ** | ** |
| # | * | * | * | * | ** | ** | ## | ** | ** | ** | ** |

Symbol 0  Symbol 1  Symbol 2  Symbol 3  Symbol 4  Symbol 5  Symbol 6  Symbol 7  Symbol 8  Symbol 9  Symbol 10  Symbol 11

Time domain

\#        DMRS #1
\##       DMRS #2
\*   First information block
\*\*  Second information block

FIG. 8

Frequency
domain

| # | * | ** | ** | ** | ** | ** | ## | * | ** | ** | ** |
| # | * | ** | ** | ** | ** | ** | ## | * | ** | ** | ** |
| # | * | ** | ** | ** | ** | ** | ## | * | ** | ** | ** |
| # | * | ** | ** | ** | ** | ** | ## | * | ** | ** | ** |
| # | * | ** | ** | ** | ** | ** | ## | * | ** | ** | ** |
| # | * | ** | ** | ** | ** | ** | ## | * | ** | ** | ** |
| # | * | ** | ** | ** | ** | ** | ## | * | ** | ** | ** |
| # | * | ** | ** | ** | ** | ** | ## | * | ** | ** | ** |
| # | * | ** | ** | ** | ** | ** | ## | * | ** | ** | ** |
| # | * | * | ** | ** | ** | ** | ## | * | * | ** | ** |
| # | * | ** | ** | ** | ** | ** | ## | * | ** | ** | ** |
| # | * | * | ** | ** | ** | ** | ## | * | * | ** | ** |

Symbol Symbol Symbol Symbol Symbol Symbol Symbol Symbol Symbol Symbol Symbol Symbol
   0      1      2      3      4      5      6      7      8      9      10     11      Time
                                                                                      domain \#           DMRS #1
\##          DMRS #2
\*    First information block
\**   Second information block

FIG. 10

S1101: A communication device receives M modulation symbols through a same physical channel, where the M modulation symbols correspond to a first information block and a second information block, the physical channel includes N spatial resources, and there is a mapping relationship between the M modulation symbols and the N spatial resources; and determines that the first information block corresponds to one or more modulation symbols S1102: The communication device obtains, based on the mapping relationship, one or more first modulation symbols that are in the M modulation symbols and that correspond to the first information block, and one or more second modulation symbols that are in the M modulation symbols and that correspond to the second information block

FIG. 11

S1201: A communication device receives one or more first modulation symbols and one or more second modulation symbols through a same physical channel, where the first modulation symbols are carried on a first resource of the physical channel, the second modulation symbols are carried on a second resource of the physical channel, and the first resource does not overlap the second resource

↓

S1202: The communication device obtains a first information block corresponding to the first modulation symbols and a second information block corresponding to the second modulation symbols

FIG. 12

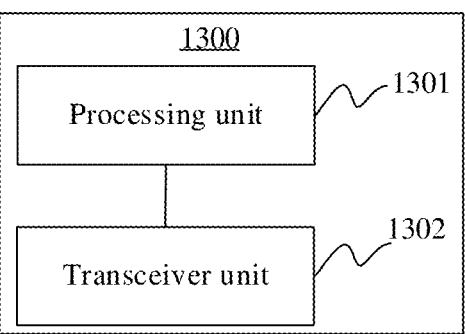

FIG. 13

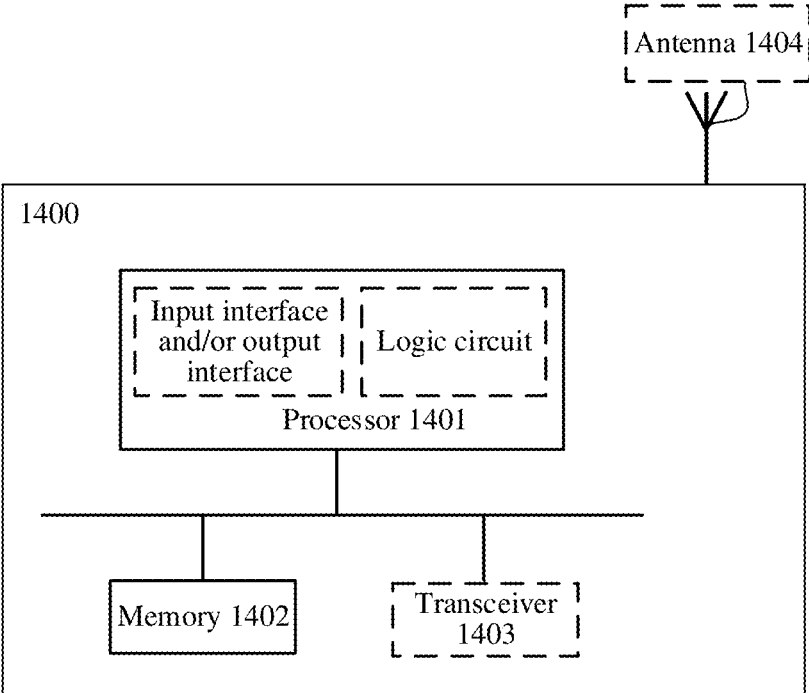

FIG. 14

RESOURCE MAPPING METHOD AND COMMUNICATION APPARATUS

CROSS-REFERENCE TO RELATED APPLICATIONS

This application is a continuation of International Patent Application No. PCT/CN2020/122424, filed on Oct. 21, 2020. The disclosure of the aforementioned application is hereby incorporated in entirety by reference.

BACKGROUND

A new communication system, for example, a fifth generation (fifth generation, 5G) system, supports one terminal device in multiplexing a plurality of services, to improve user experience.

To implement service multiplexing, a same modulation and coding scheme (modulation and coding scheme, MCS), namely, joint coding, is used for data streams transmitted on a same physical channel. However, because data streams of different services have different reliability conditions, the reliability conditions of the different data streams and spectral efficiency utilization is unable to be balanced through joint coding. Further, in response to the data streams transmitted through the same physical channel being independently coded, to distinguish between the different data streams, a communication device calls to have a large quantity of spatial resources, namely, antenna resources, and a high condition is imposed on hardware of the communication device. In addition, transport blocks, of the data streams, mapped to different spatial resources occupies a same time-frequency resource, resulting in poor flexibility.

SUMMARY

Some embodiments provide a resource mapping method and a communication apparatus for multiplex transmission of information blocks.

Some embodiments provide a resource mapping method. The method includes: A communication device determines that a first information block corresponds to one or more modulation symbols. The communication device determines that a second information block corresponds to one or more modulation symbols, where the first information block and the second information block are transmitted through a same physical channel, the first information block and the second information block correspond to a total of M modulation symbols, and the physical channel includes N spatial resources. The communication device maps the M modulation symbols to the N spatial resources, where N and M are integers greater than or equal to 2.

The communication device is a transmitting end of the first information block and the second information block, for example, is a terminal device in an uplink transmission process or a network device in a downlink transmission process.

According to the resource mapping method provided in the embodiments, the communication device independently codes and modulates the first information block and the second information block that are transmitted through the same physical channel, and maps the modulation symbols obtained through coding and modulation to the plurality of spatial resources of the physical channel. In this way, the communication device does not call to configure a large quantity of spatial resources, and used spatial resources are saved, so that transmission, of a plurality of information blocks having different performance conditions, on one physical channel is more flexibly supported, and various service multiplex transmission scenarios, for example, multiplex transmission of an ultra-reliable low-latency communication (ultra-reliable low-latency communication, URLLC) service and an enhanced mobile broadband (enhanced Mobile Broadband, eMBB) service, are applicable.

In some embodiments, the first information block corresponds to P first modulation symbols, the second information block corresponds to Q second modulation symbols, P is an integer greater than or equal to 2, Q is an integer greater than or equal to 1, and M is a sum of P and Q. That the communication device maps the M modulation symbols to the N spatial resources includes: The communication device maps the P first modulation symbols to at least two spatial resources in the N spatial resources. The communication device maps the Q second modulation symbols to a part or all of the at least two spatial resources. In this way, the first information block occupies time-frequency resources of as many layers as possible on the physical channel, so that a higher diversity gain is obtained, and transmission reliability is improved. In addition, the modulation symbols corresponding to the first information block and the modulation symbols corresponding to the second information block occupies a same spatial resource, so that resources are fully utilized, and a waste of resources are avoided.

In some embodiments, that the communication device maps the M modulation symbols to the N spatial resources includes: The communication device maps an $(N \times i + k)^{th}$ modulation symbol in the M modulation symbols to a position of an $i^{th}$ modulation symbol in a $j^{th}$ spatial resource in the N spatial resources according to Formula (1), where Formula (1) is: $x^{(j)}(i) = d(N \times i + k)$, where i, j, and k are integers greater than or equal to 0, $i \leq (M/N - 1)$, $j \leq (N-1)$, and $k \leq (N-1)$.

Some embodiments provide a resource mapping method. The method includes: A communication device determines that a first information block corresponds to one or more first modulation symbols. The communication device determines that a second information block corresponds to one or more second modulation symbols, where the first information block and the second information block are transmitted through a same physical channel. The communication device maps the first modulation symbols to a first resource, and maps the second modulation symbols to a second resource, where the first resource does not overlap the second resource.

The communication device is a transmitting end of the first information block and the second information block, for example, is a terminal device in an uplink transmission process or a network device in a downlink transmission process.

In the resource mapping manner provided in some embodiments, the communication device independently codes and modulates the first information block and the second information block that are transmitted through the same physical channel, and maps the first modulation symbols and the second modulation symbols that are obtained through coding and modulation to the non-overlapping time-frequency resources, so that the first information block and the second information block is distinguished from each other. In this solution, a spatial resource status of the communication device does not call to be considered, so that transmission, of a plurality of information blocks having different performance conditions, on one physical channel is more flexibly supported, and various service multiplex transmission scenarios, for example, multiplex transmission of a URLLC service and an eMBB service, are applicable.

Optionally, the physical channel corresponds to at least one demodulation reference signal, a first demodulation reference signal is a demodulation reference signal with a smallest start time unit index in the at least one demodulation reference signal, and a difference between a start time unit index of the first resource and a start time unit index of the first demodulation reference signal is less than a difference between a start time unit index of the second resource and the start time unit index of the first demodulation reference signal.

Optionally, the physical channel corresponds to M (M≥2) demodulation reference signals. Correspondingly, resource units occupied by the first information block are grouped into M groups, a difference between a start time unit index corresponding to a group of resource units in the M groups of resource units and a start time unit index of a second demodulation reference signal is less than a difference between a start time unit index corresponding to any other group of resource units in the M groups of resource units and the start time unit index of the second demodulation reference signal, and the second demodulation reference signal belongs to the M demodulation reference signals.

Optionally, a difference between a start time unit index of the first resource and a start time unit index of a time domain resource of the physical channel is less than a difference between a start time unit index of the second resource and the start time unit index of the time domain resource of the physical channel.

In some embodiments, that the communication device maps the first modulation symbols to a first resource, and maps the second modulation symbols to a second resource includes: The communication device maps the first modulation symbols to the first resource, and maps the second modulation symbols to the second resource based on a resource occupied by at least one demodulation reference signal corresponding to the physical channel.

In some embodiments, that the communication device maps the first modulation symbols to a first resource, and maps the second modulation symbols to a second resource includes: The communication device maps the first modulation symbols to the first resource, and maps the second modulation symbols to the second resource based on a start time unit of a time domain resource of the physical channel, where a difference between a start time unit index of the first resource and a start time unit index of the time domain resource of the physical channel is less than a difference between a start time unit index of the second resource and the start time unit index of the time domain resource of the physical channel. The first information block is mapped to a resource position closest to the start symbol by using the start symbol as a reference, so that the first information block is mapped to a front position in time domain. In this way, the first information block is processed. This is applicable to a delay-sensitive service.

In some embodiments, that the communication device maps the first modulation symbols to a first resource, and maps the second modulation symbols to a second resource includes: After mapping the first modulation symbols to the resource units included in the first resource, the communication device maps the second modulation symbols by using a remaining resource unit that is on the physical channel and that is used for data transmission. Some embodiments provide an information receiving method. The method includes: A communication device receives M modulation symbols through a same physical channel, where the M modulation symbols correspond to a first information block and a second information block, the physical channel includes N spatial resources, and there is a mapping relationship between the M modulation symbols and the N spatial resources. The communication device obtains, based on the mapping relationship, one or more first modulation symbols that are in the M modulation symbols and that correspond to the first information block, and one or more second modulation symbols that are in the M modulation symbols and that correspond to the second information block.

The communication device is a receiving end of the first information block and the second information block, for example, is a network device in an uplink transmission process or a terminal device in a downlink transmission process.

According to the information receiving method provided in the embodiments, the communication device identifies, based on the mapping relationship between the modulation symbols transmitted on the same physical channel and the spatial resources of the physical channel, modulation symbols corresponding to different information blocks, to complete a process of receiving the different information blocks transmitted on the same physical channel. Performance conditions of different services are considered, so that reliability of service information transmission is improved.

In some embodiments, the first information block corresponds to P first modulation symbols, the second information block corresponds to Q second modulation symbols, P is an integer greater than or equal to 2, Q is an integer greater than or equal to 1, and M is a sum of P and Q. That there is a mapping relationship between the M modulation symbols and the N spatial resources includes: mapping the P first modulation symbols to at least two spatial resources in the N spatial resources; and mapping the Q second modulation symbols to a part or all of the at least two spatial resources.

In some embodiments, an $(N \times i+k)^{th}$ modulation symbol in the M modulation symbols is mapped to a position of an $i^{th}$ modulation symbol in a $j^{th}$ spatial resource in the N spatial resources according to the following formula:

$$x^{(j)}(i)=d(N \times i+k), \text{ where } i,j, \text{ and } k \text{ are integers greater}$$
$$\text{than or equal to } 0, i \leq (M/N-1), j \leq (N-1), \text{ and}$$
$$k \leq (N-1).$$

In some embodiments, the first information block corresponds to X first modulation symbols, $X \geq N$, and each of the N spatial resources includes at least one first modulation symbol. Alternatively, the first information block corresponds to X first modulation symbols, $X < N$, and each of X spatial resources in the N spatial resources includes at least one first modulation symbol. In this way, the first information block occupies time-frequency resources of as many layers as possible on the physical channel, so that a higher diversity gain is obtained, and transmission reliability is improved.

In some embodiments, the mapping relationship between the M modulation symbols and the N spatial resources is determined according to a spatial resource mapping order indicated by a network device.

Optionally, the mapping order includes: mapping the modulation symbols corresponding to the first information block to a first spatial resource, where the first spatial resource belongs to the N spatial resources, and is determined by the network device. Optionally, the first spatial resource corresponds to strongest signal strength in the N spatial resources. A higher signal-to-noise ratio is obtained for information transmitted on a spatial resource with stronger signal strength. This is more suitable for transmission of high-priority information.

Some embodiments provide an information receiving method. The method includes: A communication device receives one or more first modulation symbols and one or more second modulation symbols through a same physical channel, where the first modulation symbols are carried on a first resource of the physical channel, the second modulation symbols are carried on a second resource of the physical channel, and the first resource does not overlap the second resource. The communication device obtains a first information block corresponding to the first modulation symbols and a second information block corresponding to the second modulation symbols.

The communication device is a receiving end of the first information block and the second information block, for example, is a network device in an uplink transmission process or a terminal device in a downlink transmission process.

According to the information receiving method provided in the embodiments, the communication device receives, by using the non-overlapping resources on the same physical channel, the modulation symbols corresponding to the first information block and the second information block, to identify modulation symbols corresponding to different information blocks, and complete a process of receiving the different information blocks transmitted on the same physical channel. Performance conditions of different services are considered, so that reliability of service information transmission is improved.

In some embodiments, the first resource and the second resource are determined based on a resource occupied by at least one demodulation reference signal corresponding to the physical channel.

Optionally, the first resource and the second resource are determined based on a resource occupied by a first demodulation reference signal, the first demodulation reference signal is a demodulation reference signal with a smallest start time unit index in the at least one demodulation reference signal, and a difference between a start time unit index of the first resource and a start time unit index of the first demodulation reference signal is less than a difference between a start time unit index of the second resource and the start time unit index of the first demodulation reference signal.

Optionally, the physical channel corresponds to M demodulation reference signals, the first information block occupies M groups of resource units, and M is an integer greater than or equal to 2. A second demodulation reference signal in the M demodulation reference signals is used to map one or more first modulation symbols corresponding to a group of resource units in the M groups of resource units, and a difference between a start time unit index of the second demodulation reference signal and a start time unit index corresponding to the group of resource units is less than a difference between the start time unit index of the second demodulation reference signal and a start time unit index corresponding to any other group of resource units in the M groups of resource units. Each group of resource units is located at a resource position closest to a demodulation reference signal corresponding to the group of REs, so that the entire first information block is mapped to the resource position closest to each demodulation reference signal, improving decoding accuracy of the first information block.

In some embodiments, the first resource and the second resource are determined based on a start time unit of a time domain resource of the physical channel, and a difference between a start time unit index of the first resource and a start time unit index of the time domain resource of the physical channel is less than a difference between a start time unit index of the second resource and the start time unit index of the time domain resource of the physical channel.

In some embodiments, the first resource includes X resource units, $$X \geq \sum_{i=l_0}^{l_1} M_i, \text{ and } X < \sum_{i=l_0}^{l_1+1} M_i,$$

where $l_0$ represents an index of a start time unit that is in a time domain resource of the physical channel and that is available for transmission of the first information block; $M_i$ represents a quantity of resource units that are on an $i^{th}$ time unit and that are used to transmit the first information block; $l_1$ represents an index of a first time unit used to transmit the first information block; the first time unit has a largest index in at least one time unit whose resource units that are available for transmission of the first information block are occupied by the first information block; and i and $M_i$ are integers greater than or equal to 0.

In some embodiments, the first resource includes two or more consecutive resource units on an $(l_1+1)^{th}$ time unit.

In some embodiments, the first resource includes two or more resource units on an $(l_1+1)^{th}$ time unit, and at least two adjacent resource units in the two or more resource units are discrete. The resource units, on the $(l_1+1)^{th}$ time unit, carrying the first modulation symbols are evenly distributed on a frequency band of the entire time unit as much as possible, so that a higher frequency diversity gain is obtained.

In some embodiments, there is an interval d between any two adjacent resource units in the two or more resource units, and d is an integer greater than or equal to 1.

In some embodiments, a priority of the first information block is higher than a priority of the second information block. The network device sends priority indication information to the terminal device.

Some embodiments provide a communication apparatus. The apparatus has a function of implementing the communication device in any one of the embodiments. For example, the apparatus includes a corresponding module, unit, or means (means) used for the steps performed by the communication device in any one of the embodiments. The function, the unit, or the means (means) is implemented by software, or is implemented by hardware, or is implemented by hardware executing corresponding software.

Optionally, the communication apparatus is a terminal device or a network device, or is an apparatus, for example, a chip, used in the terminal device or the network device.

In a possible design, the apparatus includes a processing unit and a transceiver unit. Functions performed by the processing unit and the transceiver unit corresponds to the steps performed by the communication device in any one of the embodiments.

In a possible design, the apparatus includes a processor, and further includes a transceiver. The transceiver is configured to send and receive a signal, and the processor executes program instructions, to complete the method performed by the communication device in any one of the possible implementations of the embodiments.

The apparatus further includes one or more memories. The memory is configured to be coupled to the processor.

The one or more memories are integrated with the processor, or is disposed independent of the processor. This is not limited in the embodiments.

In a possible manner, the memory stores computer program instructions and/or data that are/is necessary for implementing a function of the communication device in any one of the embodiments. The processor executes the computer program instructions stored in the memory, to complete the method performed by the communication device in any one of the possible designs or implementations of the embodiments.

Some embodiments provide a computer-readable storage medium. The computer storage medium stores computer-readable instructions. In response to a computer reading and executing the computer-readable instructions, the computer is enabled to perform the method in any one of the foregoing possible designs.

Some embodiments provide a computer program product. In response to a computer reading and executing the computer program product, the computer is enabled to perform the method in any one of the foregoing possible designs.

Some embodiments provide a chip system. The chip system is configured to read and execute a software program stored in a memory, to implement the method in any one of the foregoing possible designs. The memory is connected to the chip system, or the memory is built in the chip system.

BRIEF DESCRIPTION OF DRAWINGS

FIG. 3 is a schematic flowchart of a resource mapping method according to some embodiments;

FIG. 4 is a diagram of mapping a modulation symbol to a spatial resource according to some embodiments;

FIG. 5 is a diagram of mapping a modulation symbol to a spatial resource according to some embodiments;

FIG. 6 is a schematic flowchart of a resource mapping method according to some embodiments;

FIG. 8 is a schematic diagram of mapping a modulation symbol to a time-frequency resource according to some embodiments;

FIG. 10 is a schematic diagram of mapping a modulation symbol to a time-frequency resource according to some embodiments;

FIG. 11 is a schematic flowchart of an information receiving method according to some embodiments;

FIG. 12 is a schematic flowchart of an information receiving method according to some embodiments;

FIG. 13 is a schematic diagram of a structure of a communication apparatus 1300 according to some embodiments; and FIG. 14 is a schematic diagram of a structure of a communication apparatus 1400 according to some embodiments.

DESCRIPTION OF EMBODIMENTS

The following describes embodiments in detail with reference to the accompanying drawings of the embodiments.

Some embodiments are applied to various mobile communication systems, such as a new radio (new radio, NR) system, a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, a long term evolution-advanced (advanced long term evolution, LTE-A) system, a universal mobile telecommunications system (universal mobile telecommunications system, UMTS), an evolved long term evolution (evolved long term evolution, eLTE) system, and a future-oriented new communication system. This is not limited herein.

Figure 1:
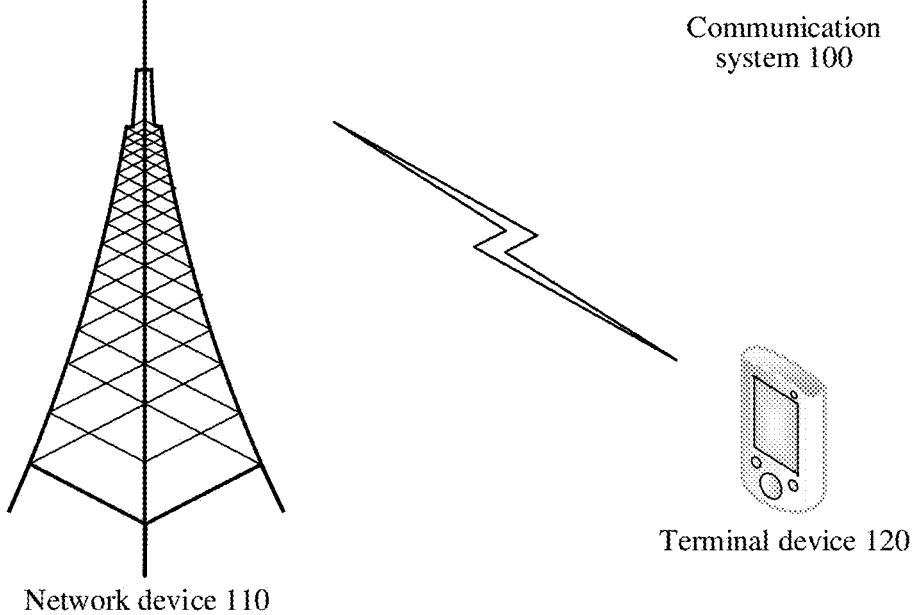
FIG. 1 is a schematic diagram of a communication system to which a communication method according to some embodiments.

For ease of understanding some embodiments, a communication system shown in FIG. 1 is first used as an example to describe in detail a communication system to which some embodiments are applicable. FIG. 1 is a schematic diagram of a communication system to which a communication method according to some embodiments. As shown in FIG. 1, the communication system 100 includes a network device 101 and a terminal device 102. A plurality of antennas are configured for the network device 101, and a plurality of antennas further are configured for the terminal device 102.

In some embodiments, a terminal device is a device having a wireless transceiver function, or a chip that is disposed in the device. The device having the wireless transceiver function further is referred to as user equipment (user equipment, UE), an access terminal, a user unit, a user station, a mobile station, a remote station, a remote terminal, a mobile device, a user terminal, a user agent, or a user apparatus. During application, the terminal device in some embodiments are a mobile phone (mobile phone), a tablet computer (Pad), a computer having a wireless transceiver function, a virtual reality (virtual reality, VR) terminal, an augmented reality (augmented reality, AR) terminal, or a wireless terminal used in various communication scenarios such as an industrial control (industrial control), self-driving (self-driving), telemedicine (remote medical), a smart grid (smart grid), transportation safety (transportation safety), a smart city (smart city), and a smart home (smart home). An application scenario is not limited in some embodiments. In some embodiments, the device having the wireless transceiver function and the chip that is disposed in the device are collectively referred to as the terminal device. In some embodiments, UE is used as the terminal device for description. Details are not described below again.

In some embodiments, a network device is a radio access device in various standards, for example, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), an access point (access point, AP) in a wireless fidelity (wireless fidelity, Wi-Fi) system, a wireless relay node, a wireless backhaul node, or a transmission point (transmission and reception point, TRP or transmission point, TP). The network device alternatively is a gNB or a transmission point (TRP or TP) in a 5G (NR) system, one or a group of antenna panels (including a plurality of antenna panels) of a base station in a 5G system, a network node that constitutes a gNB or a transmission point, for example, a CU or a DU of a gNB using a central unit-distributed unit (central unit-distributed unit, CU-DU) architecture.

As shown in FIG. 1, the network device 101 and the terminal device 102 perform uplink/downlink transmission, including uplink/downlink data transmission and uplink/downlink signaling transmission. For example, in a downlink data transmission process, the terminal device 102 detects a downlink control channel #1 sent by the network device 101, and receives a downlink data channel from the network device 101 based on indication information on the downlink control channel #1. In an uplink data transmission process, the terminal device detects a downlink control channel #2 sent by the network device 101, and sends an uplink data channel to the network device 101 based on indication information on the downlink control channel #2. In some embodiments, the downlink control channel is a physical downlink control channel (physical downlink control channel, PDCCH), the uplink data channel is a physical uplink shared channel (physical uplink shared channel, PUSCH), and the downlink data channel is a physical downlink shared channel (physical downlink shared channel, PDSCH). In addition, the terminal device 102 further sends, to the network device 101 through a physical uplink control channel (physical uplink control channel, PUCCH) or the PUSCH, uplink control information (uplink control information, UCI) such as a scheduling request (scheduling request, SR), a hybrid automatic repeat request acknowledgment (hybrid automatic repeat request acknowledgment, HARQ-ACK), and channel state information (channel state information, CSI).

Both uplink transmission and downlink transmission support multiplex transmission. Two or more information blocks are transmitted through a same physical channel, where the information blocks are data blocks, or is used to carry signaling. Each information block includes one or more modulation symbols. In some embodiments, the data block is a transport block (transmission block, TB) or another data unit. This is not limited. In response to the information block being used to carry signaling, the signaling is a control signal, for example, UCI.

For example, the information block is a data block. Two or more data blocks transmitted through a same physical channel belongs to different service types, for example, respectively belong to a URLLC service and an eMBB service. Two or more data blocks transmitted through a same physical channel is of a same service type but have different conditions. For example, both the two data blocks belong to a URLLC service, but reliability is 99.9% and 99.9999% respectively. In addition, the two or more data blocks transmitted through the same physical channel is new data blocks, retransmitted data blocks, or one new data block and one retransmitted data block. This is not limited. The physical channel is a physical data channel, for example, a PDSCH/PUSCH, or is a physical control channel, for example, a PUCCH. The following uses an example in which the data block is a TB and the physical channel is a physical data channel for description. To transmit a plurality of TBs on one data channel, codewords (codewords) corresponding to the plurality of TBs are mapped to different spatial resources of the data channel after being independently coded and modulated, that is, different TBs are distinguished in a spatial dimension. Independent coding and modulation include using different modulation and coding schemes (modulation and coding schemes, MCSs) for TBs of different services.

In some embodiments, a spatial resource further is referred to as a layer (layer), and is related to an antenna resource of the terminal device or the network device. Usually, a larger quantity of antenna resources indicates that a physical channel is configured to have more layers. The layer refers to a data stream that is independently transmitted. One layer means that one data stream is independently transmitted on a same time-frequency resource. Two layers mean that two data streams are independently transmitted on a same time-frequency resource. In brief, multi-stream data is transmitted on a same time-frequency resource in a spatial dimension.

Figure 2:
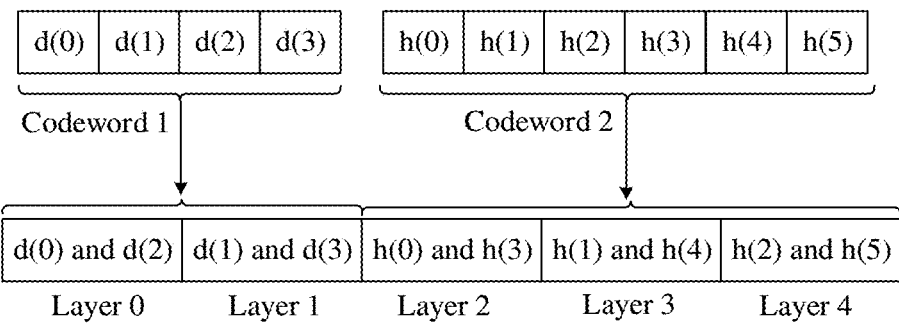
FIG. 2 is a schematic diagram of mapping a codeword to a layer in accordance with some embodiments.

Refer to FIG. 2. For example, two codewords correspond to two TBs. A codeword 1 corresponds to a TB 1, and modulation symbols obtained by coding and modulating the codeword 1 are d(0), d(1), d(2), and d(3). A codeword 2 corresponds to a TB 2, and modulation symbols obtained by performing coding and modulation that are independent of the TB 1 on the codeword 2 are h(0), h(1), h(2), h(3), h(4) and h(5). In response to five layers (a layer 0 to a layer 4) being used for transmission through the PDSCH, the modulation symbols corresponding to the TB 1 are mapped to the layer 0 and the layer 1, and the modulation symbols corresponding to the TB 2 are mapped to the layer 2, the layer 3, and the layer 4. In other words, modulation symbols corresponding to different TBs are independently mapped to different spatial resources. Therefore, TBs of different services are distinguished by using the spatial resources.

However, by mapping different TBs that are independently coded to different layers, multiplex transmission is implemented, but flexibility is limited. Not each communication device supports a high spatial dimension. For example, a part of terminal devices has one or two transmitting/receiving antennas. Consequently, to support a large quantity of layers for data transmission is difficult. In other words, this mapping manner has a high condition on hardware performance of the communication device. In addition, multiplex transmission is performed in a spatial dimension, and TBs of different service data occupy a same time-frequency resource. Consequently, TBs of different services are limited to occupy a same time-frequency resource. For example, as shown in FIG. 2, quantities of modulation symbols that is carried on different layers each are 2. In other words, quantities of modulation symbols corresponding to two transmitted TBs call to have a determined correspondence. In FIG. 2, a quantity of layers for transmitting the TB 1 is 2, and a quantity of layers for transmitting the TB 2 is 3. Therefore, a ratio of a quantity of modulation symbols corresponding to the TB 1 and a quantity of modulation symbols corresponding to the TB 2 is 2:3. The determined proportion relationship is unable to flexibly support various data transmission scenarios. For example, in response to a service having an excessively large data amount, and another service corresponds to an excessively small data amount, a large quantity of transmission resources are wasted for the service having a small data amount.

In some embodiments, a network architecture and a service scenario that are described in some embodiments are intended to describe technical solutions in some embodiments more clearly, and do not constitute a limitation on the technical solutions provided in some embodiments. A person of ordinary skill in the art is able to know that, with evolution of the network architecture and emergence of new service scenarios, the technical solutions provided in some embodiments are also applicable to similar technical problems.

Resources in some embodiments further are referred to as transmission resources, including one or both of a time domain resource and a frequency domain resource, and is used to carry data or signaling in an uplink communication process or a downlink communication process. The time domain resource includes one or more time units. The time unit is various time units such as a slot, a sub-slot, a subframe, a radio frame, a superframe, or a time domain symbol. The time domain symbol is an orthogonal frequency division multiplexing (orthogonal frequency division multiplexing, OFDM) symbol. The frequency domain resource includes one or more frequency domain units. The frequency domain unit is a subcarrier. In some embodiments, a time domain resource and a frequency domain resource are referred to as a "time-frequency resource" for short. In some embodiments, a unit of the time-frequency resource is referred to as a resource unit, for example, a resource element (resource element, RE). One RE includes one OFDM symbol and one subcarrier on the OFDM symbol. Usually, one OFDM symbol includes 12 subcarriers. Correspondingly, one OFDM symbol includes 12 REs. A time-frequency resource called for transmitting a modulation symbol is an RE on an OFDM symbol. A representation manner of a time unit, a frequency domain unit, or a resource unit is not limited in some embodiments.

In some embodiments, the term "and/or" in the embodiments describes an association relationship for describing associated objects and represents that three relationships exists. For example, A and/or B represents the following three cases: A exists, both A and B exist, and B exists.

In some embodiments, "B corresponding to A" indicates that B is associated with A, and B is determined based on A. However, in some embodiments, determining B based on A does not mean that B is determined based on A, that is, B alternatively is determined based on A and/or other information.

In some embodiments, "a plurality of" means two or more than two.

In some embodiments, descriptions such as "first" and "second" are used to indicate and distinguish between described objects, do not indicate a sequence, do not indicate a limitation on a quantity of described objects in some embodiments, and do not constitute any limitation on some embodiments.

In some embodiments, unless otherwise specified, "transmission" (transmit/transmission) refers to bidirectional transmission, and includes a sending action and/or a receiving action. "Transmission" in some embodiments includes data sending, data receiving, or data sending and receiving. In other words, data transmission herein includes uplink data transmission and/or downlink data transmission. Data includes information and/or a signal. The uplink data transmission is uplink information transmission and/or uplink signal transmission, and the downlink data transmission is downlink information transmission and/or downlink signal transmission.

In some embodiments, the terminal device and/or the network device performs a part or all steps in some embodiments. These steps or operations are examples. In some embodiments, other operations or variations of various operations are further performed. In addition, the steps are performed in a sequence different from a sequence presented in some embodiments, and not each operation in some embodiments are necessarily to be performed.

To meet reliability conditions of different services and flexibly perform data/signaling transmission, some embodiments provide a resource mapping method on a basis that independent MCSs are used for information blocks transmitted through a same physical channel. A communication device does not call to have a large quantity of antenna resources, and a data amount is not limited. This is applicable to various communication scenarios and has high flexibility.

FIG. 3 is a schematic flowchart of a resource mapping method according to some embodiments. As shown in FIG. 3, the method includes the following steps.

S301: A communication device determines that a first information block corresponds to one or more modulation symbols.

S302: The communication device determines that a second information block corresponds to one or more modulation symbols.

The communication device is a transmitting end of the first information block and the second information block, and is UE in an uplink transmission process or a network device in a downlink transmission process. In addition, the communication device alternatively is an apparatus, for example, a chip, used in the UE or the network device.

The first information block and the second information block are transmitted through a same physical channel, and the first information block and the second information block correspond to a total of M modulation symbols. The physical channel includes N spatial resources, and the N spatial resources correspond to a same time-frequency resource. N and M are integers greater than or equal to 2.

In some embodiments, there is no execution sequence of S301 and S302. S301 is performed before S302, S302 is performed before S301, or S301 and S302 is performed simultaneously.

For ease of description, in some embodiments, the modulation symbols corresponding to the first information block are referred to as first modulation symbols, and the modulation symbols corresponding to the second information block are referred to as second modulation symbols.

The first information block/second information block is a data block or control information. Because the first information block and the second information block are transmitted through the same physical channel, the first information block and the second information block are scheduled by using the physical channel as a whole. The network device schedules transmission of the first information block and the second information block by using one piece of DCI.

The physical channel is not limited to an uplink physical channel or a downlink physical channel in some embodiments. In other words, the resource mapping method provided in some embodiments are applied to uplink data transmission or downlink data transmission, or is applied to uplink control information transmission. In response to the method being performed by the UE or the apparatus used in the UE, the physical channel is an uplink physical channel. In response to the method being performed by the network device or the apparatus used in the network device, the physical channel is a downlink physical channel. Optionally, in response to the first information block and the second information block being the data blocks such as TBs, the physical channel is a physical data channel, for example, a PDSCH or a PUSCH. In response to the first information block and the second information block being used to carry uplink control information, the physical channel is a physical control channel, for example, a PUCCH, or is a physical data channel, for example, a PUSCH.

Optionally, the first information block and the second information block are TBs of different services or UCI used for data transmission of different services. For example, the first information block corresponds to a URLLC service, and the second information block corresponds to an eMBB service.

That the communication device determines the one or more first modulation symbols includes: The communication device codes and modulates, by using a first MCS, one or more bits included in the first information block, to obtain the one or more first modulation symbols, where each R bits correspond to one first modulation symbol, and R is an integer greater than or equal to 2. Similarly, that the communication device determines the one or more second modulation symbols includes: The communication device codes and modulates, by using a second MCS, one or more bits included in the second information block, to obtain the one or more second modulation symbols. The first MCS is different from the second MCS. That is, the communication device independently codes and modulates the first information block and the second information block. The first MCS and the second MCS is determined by the network device and indicated to the UE. Therefore, that the first information block or the second information block corresponds to one or more modulation symbols means that one or more bits included in the first information block or the second information block are mapped to the one or more modulation symbols after being coded and modulated.

The MCS includes a modulation scheme and a coding scheme. That the first MCS is different from the second MCS is that a modulation scheme corresponding to the first MCS is different from a modulation scheme corresponding to the second MCS, or a coding scheme corresponding to the first MCS is different from a coding scheme corresponding to the second MCS.

The physical channel includes the N spatial resources. In other words, the physical channel includes N layers. A value of N, namely, a quantity of layers included in the physical channel, is determined by the network device and indicated to the UE, for example, indicated to the UE by using downlink control information (downlink control information, DCI). Usually, a total quantity of modulation symbols corresponding to the information blocks transmitted on the physical channel is an integer multiple of the quantity of layers included in the physical channel, that is, $M=m \times N$, where m is an integer greater than or equal to 1. In addition, that the N layers correspond to a same time-frequency resource includes: The N layers respectively correspond to a same quantity of time units. A size of a time-frequency resource corresponding to each layer is determined by the network device and indicated to the UE, or is preset. This is not limited in some embodiments.

S303: The communication device maps the M modulation symbols to the N spatial resources.

In some embodiments, the communication device maps, to the time-frequency resources of the physical channel, the M modulation symbols mapped to the N spatial resources, and then send the first information block and the second information block to a receiving end through the physical channel. In response to the communication device being the UE, the UE sends the first information block and the second information block to the network device through the uplink physical channel. In response to the communication device being the network device, the network device sends the first information block and the second information block to the UE through the downlink physical channel. Details are not described.

In some embodiments, the first information block corresponds to P first modulation symbols, the second information block corresponds to Q second modulation symbols, and $M=P+Q$, where P and Q are integers greater than or equal to 1 is assumed. Optionally, in an implementation of the embodiments, at least one modulation signal corresponding to the first information block and at least one modulation signal corresponding to the second information block are mapped to a same spatial resource. In other words, at least one spatial resource includes at least one first modulation symbol and at least one second modulation symbol. in response to In response to the first information block corresponding to two or more first modulation symbols, that is, in response to $P \geq 2$, the communication device maps the P first modulation symbols to at least two spatial resources in the N spatial resources, and maps the Q second modulation symbols to a part or all of the at least two spatial resources. Because different information blocks are mapped to a same spatial resource, a time-frequency resource corresponding to one spatial resource is fully used, avoiding a waste of resources.

That a spatial resource includes a modulation symbol means that the modulation symbol is mapped to the spatial resource, or the modulation symbol is transmitted on the spatial resource. For example, that symbols a1, a2, and a3 are mapped to a spatial resource #1 is expressed as that a spatial resource #1 includes symbols a1, a2, and a3.

Usually, after modulation symbols corresponding to a same information block are mapped, modulation symbols corresponding to another information block is mapped. For example, the M modulation symbols include the P first modulation symbols and the Q second modulation symbols. In this case, the P first modulation symbols are mapped to a part or all of the N spatial resources, and then the Q second modulation symbols are mapped to a part or all of the spatial resources on which the P first modulation symbols are located. Optionally, a mapping order of the first modulation symbols and the second modulation symbols are indicated by the network device. For example, the network device sends priority information or priority indication information to the UE, where the priority information includes a service priority or a reliability condition priority of a data block. In this way, the UE maps a modulation symbol corresponding to a data block with a high service priority, or map a modulation symbol corresponding to a data block with a high reliability condition. Therefore, data with a high service priority or a high reliability condition is not affected by low-priority data during mapping, so that a condition of the high-priority data is ensured as much as possible.

Optionally, the communication device determines, based on a quantity of the first modulation symbols, a status in which the first information block is mapped to the N spatial resources. In response to $P \geq N$, each of the N spatial resources includes at least one first modulation symbol, in other words, the modulation symbols corresponding to the first information block are evenly distributed on the N spatial resources. Alternatively, in response to $P < N$, P spatial resources in the N spatial resources each include at least one first modulation symbol. In this way, the first information block occupies time-frequency resources of as many layers as possible on the physical channel, so that a higher diversity gain is obtained, and transmission reliability is improved.

Optionally, in an implementation of the embodiments, the M modulation symbols corresponding to the first information block and the second information block are mapped to the N spatial resources through cross mapping.

The M modulation symbols are sorted according to a predetermined rule. Optionally, an order of the M modulation symbols are that the first modulation symbols are arranged, and then the second modulation symbols are arranged. For example, $P=3$ there are three first modulation symbols, which are respectively a0, a1, a2; and $Q=7$ there are seven second modulation symbols, which are respectively b0, b1, . . . , and b6 is assumed. In this case, the M modulation symbols are a0, a1, a2, b0, b1, . . . , and b6. An arrangement order is indicated by the network device, or is predetermined in a protocol. In some embodiments, the first modulation symbols are arranged is assumed.

The following describes, by using an example, a process of performing cross mapping on the M modulation symbols. The first information block and the second information block correspond to a total of 10 modulation symbols after being coded and modulated, that is, M=10, where the first information block corresponds to the modulation symbols a0, a1, and a2, the second information block corresponds to the modulation symbols b0, b1, . . . , and b6, and an arrangement order of the M modulation symbols is {a0, a1, a2, b0, b1, . . . , b6} is assumed. In addition, the physical channel carrying the first information block and the second information block includes two spatial resources, that is, a quantity of layers is 2 (N=2) is assumed. The two spatial resources are represented by a layer 1 and a layer 2. Each layer corresponds to a time-frequency resource corresponding to five REs, that is, each layer carries five modulation symbols. The first performing cross mapping on the modulation symbols corresponding to the first information block includes: mapping a0 to the layer 1, mapping a1 to the layer 2, and then mapping a2 to the layer 1. After the layer 2 carries a2, more time-frequency resources are available than those corresponding to the layer 1. Therefore, the layer 2 is used as a start layer to which the second information block is mapped, and b0 is mapped to the layer 2. Then, b1 is mapped to the layer 1, and b2 is mapped to the layer 2. Finally, b6 is mapped to the layer 2 according to this mapping rule. As shown in FIG. 4, the modulation symbols mapped to the layer 1 are a0, a2, b1, b3, b5, and the modulation symbols mapped to the layer 2 are a1, b0, b2, b4, b6 is obtained. Optionally, in response to the first information block including a0, a1, a2, and a3, a0 and a2 are mapped to the layer 1, and a1 and a3 are mapped to the layer 2. Alternatively, the layer 1 is used as a start layer to which second information block is mapped. Details are not described again.

Optionally, the communication device implements the foregoing cross mapping according to the following Formula (1):

$$x^{(j)}(i)=d(N \times i+k) \tag{Formula (1)}$$

where $d(N \times i+k)$ represents an $(N \times i+k)^{th}$ modulation symbol in the M modulation symbols, and $x^{(j)}(i)$ represents an $i^{th}$ modulation symbol in a $j^{th}$ spatial resource in the N spatial resources. Therefore, the $(N \times i+k)^{th}$ modulation symbol is mapped to the $i^{th}$ modulation symbol in the $j^{th}$ spatial resource according to Formula (1).

Optionally, the M modulation symbols are counted from the $0^{th}$ modulation symbol, where i, j, and k are integers greater than or equal to 0, $i \leq (M/N-1)$, $j \leq (N-1)$, and $k \leq (N-1)$. Optionally, the M modulation symbols are counted from the $1^{st}$ modulation symbol, where i, j, and k are integers greater than or equal to 1, $i \leq M/N$, $j \leq N$, and $k \leq N$. Optionally, different layers correspond to different k. For example, for the $1^{st}$ layer, k=0. In this case, k corresponding to the $2^{nd}$ layer is not 0. For example, k=1. k corresponding to each layer, namely, a correspondence between j and k, is predetermined. Optionally, k=j.

In response to the 10 modulation symbols (a0, . . . , and b6) being mapped according to Formula (1), i, j, and k are integers greater than or equal to 0, and values of j and k are the same is assumed. N=2, j={0, 1}, k={0, 1}, and i={0, 1, 2, 3, 4}. For the layer 1, $x^{(0)}(i)=d(2i)$. For the layer 2, $x^{(1)}(i)=d(2i+1)$. $x^{(0)}(0)=d(0)$, $x^{(0)}(1)=d(2)$, $x^{(0)}(2)=d(4)$, $x^{(0)}(3)=d(6)$, $x^{(0)}(4)=d(8)$, $x^{(1)}(0)=d(1)$, $x^{(1)}(1)=d(3)$, $x^{(1)}(2)=d(5)$, $x^{(1)}(3)=d(7)$, and $x^{(1)}(4)=d(9)$ is obtained by substituting i={0, 1, 2, 3, 4} into Formula (1). In other words, d(0), d(2), d(4), d(6), and d(8) are mapped to the layer 1, and d(3), d(5), d(7), and d(9) are mapped to the layer 2. In some embodiments, according to the order of the M symbols that d(0), d(1), d(2), . . . , and d(9) respectively correspond to a0, a1, a2, b0, b1, . . . and b6.

Optionally, in an implementation of the embodiments, the communication device maps the first information block and the second information block according to the spatial resource mapping order determined by the network device. The spatial resource mapping order is an order in which the modulation symbols are mapped to the spatial resources included in the physical channel, and further is referred to as a spatial resource mapping priority. In addition, the network device sends, to the terminal device, the mapping order determined by the network device. In response to the communication device being the UE, the UE maps the first information block and the second information block according to the mapping order indicated by the network device. In response to the communication device being the network device, the network device maps the first information block and the second information block according to the mapping order determined by the network device, and send the mapping order to the terminal device, so that the terminal device identifies the first information block/second information block according to the mapping order, to complete a process of receiving the first information block and the second information block.

Optionally, the mapping order includes: mapping the modulation symbols corresponding to the first information block to a first spatial resource, where the first spatial resource belongs to the N spatial resources, and is determined by the network device. Optionally, the first spatial resource corresponds to strongest signal strength in the N spatial resources. In other words, the network device determines the mapping order based on signal strength corresponding to the spatial resources. A higher signal-to-noise ratio is obtained for information transmitted on a spatial resource with stronger signal strength. This is more suitable for transmission of high-priority information.

In response to a maximum quantity of modulation symbols that is accommodated by the first spatial resource being greater than a quantity of first modulation symbols, the communication device maps the first modulation symbols to the first spatial resource, and then maps the second modulation symbols to the first spatial resource. In response to a maximum quantity of modulation symbols that is accommodated by the first spatial resource being less than a quantity of first modulation symbols, the communication device fully uses the first spatial resource to map a part of the first modulation symbols, and then maps remaining first modulation symbols to a second spatial resource. In response to a maximum quantity of modulation symbols that is accommodated by the first spatial resource being equal to a quantity of first modulation symbols, the communication device maps the first modulation symbols to the first spatial resource, and then maps the second modulation symbols to a second spatial resource. The second spatial resource further is indicated by the network device, and a mapping order is lower than that of the first spatial resource. Optionally, signal strength corresponding to the second spatial resource is lower than signal strength corresponding to the first spatial resource in the N spatial resources, that is, the second spatial resource is a layer with second strongest signal strength. The second spatial resource is further used to map the second modulation symbols. Details are not described again.

That the first information block corresponds to the modulation symbols a0, a1, and a2, the second information block corresponds to the modulation symbols b0, b1, . . . , and b6, and the physical channel includes the two spatial resources (the layer 1 and the layer 2) is still used as an example to describe a manner in which the communication device performs mapping according to the spatial resource mapping order. The first information block is a data block 1 having a higher reliability condition, and the second information block is a data block 2 having a lower reliability condition is assumed. In other words, a priority of the data block 1 is higher than a priority of the data block 2. Signal strength corresponding to the layer 1 is higher than signal strength corresponding to the layer 2, that is, a higher signal-to-noise ratio is obtained for data transmitted at the layer 2 is assumed. Therefore, the data block 1 having the higher reliability condition is mapped to a strongest layer, as shown in FIG. 5. In some embodiments, in response to the layer 1 carrying five modulation symbols, but the data block 1 corresponds to three modulation symbols, positions of remaining two modulation symbols of the layer 1 are mapped by the data block 2. In this way, quantities of modulation symbols corresponding to the data block 1 and the data block 2 is in any proportion is ensured. A final result is that the layer 1 carries a0, a1, a2, b0, and b1, and the layer 2 carries b2, b3, b4, b5, and b6. In response to the data block calling for a plurality of layers of resources, the data block 1 is mapped to the strongest layer. After the strongest layer is fully mapped, the remaining modulation symbols of the data block 1 are mapped to the second strongest layer.

Optionally, in response to the communication device being the UE, the method includes S300-1: The UE receives mapping order indication information from the network device.

For example, in response to the physical channel including three spatial resources, which are represented by a layer 1, a layer 2, and a layer 3, the network device indicates a mapping order of the three spatial resources to the UE, for example, indicate that modulation symbol mapping is first performed on the layer 1, then performed on the layer 2, and finally performed on the layer 3. After receiving the indication, the UE carries the modulation symbols corresponding to the first information block or the second information block on the layer 1. Signal strength corresponding to the layer 1 is the strongest in the three spatial resources.

Optionally, the spatial resource mapping order is indicated by using a demodulation reference signal (demodulation reference signal, DMRS) port. The three spatial resources are still used as an example, and respectively correspond to DMRS ports X, Y, and Z. In this case, the network device indicates {Y, Z, X}. Therefore, modulation symbol mapping is first performed on a layer corresponding to the DMRS port Y, then performed on Z, and finally performed on X.

Optionally, in response to the communication device being the network device, the method includes S300-2: The network device sends mapping order indication information to the UE.

In some embodiments, there is no limitation on an execution sequence of S300-1 or S300-2 and steps S301 and S302.

Optionally, in response to the communication device being the UE, the method further includes: The UE receives priority indication information from the network device, where the priority indication information is determined by the network device, and indicates priorities of the first information block and the second information block, for example, indicates that the priority of the first information block is higher than the priority of the second information block. The UE maps the high-priority information block based on the priority indication information.

Optionally, in response to the communication device being the network device, the method further includes: The network device sends priority indication information to the UE. Optionally, the mapping order indication information and the priority indication information is included in same DCI sent by the network device to the UE.

According to the resource mapping method provided in some embodiments, the UE or the network device independently codes and modulates the first information block and the second information block that are transmitted through the same physical channel, and maps the modulation symbols obtained through coding and modulation to the plurality of spatial resources of the physical channel. In this way, the UE or the network device does not call to configure a large quantity of spatial resources, and used spatial resources are saved, so that transmission, of a plurality of information blocks having different performance conditions, on one physical channel is more flexibly supported, and various service multiplex transmission scenarios are applicable. In addition, an information block having a high service priority or a high reliability condition is mapped, so that transmission quality of a high-priority service is improved is considered.

FIG. 6 is a schematic flowchart of another resource mapping method according to some embodiments.

S601: A communication device determines that a first information block corresponds to one or more first modulation symbols.

S602: The communication device determines that a second information block corresponds to one or more second modulation symbols.

The communication device is a transmitting end of the first information block and the second information block, and is UE in an uplink transmission process or a network device in a downlink transmission process. In addition, the communication device alternatively is an apparatus, for example, a chip, used in the UE or the network device. The first information block and the second information block are transmitted through a same physical channel. The first information block and the second information block is data blocks or control information, and the communication device independently codes and modulates the first information block and the second information block. For detailed descriptions of the physical channel and the first information block/second information block, refer to related content in the foregoing embodiment. Details are not described again.

An execution sequence of S601 and S602 is not limited in some embodiments. For detailed descriptions of S601 and S602, refer to S301 and S302. Details are not described again.

Optionally, a priority of the first information block is higher than a priority of the second information block. The network device sends priority indication information to the UE. For detailed descriptions of the priority, refer to related content in the foregoing embodiment. Details are not described again.

S603: The communication device maps the first modulation symbols to a first resource, and maps the second modulation symbols to a second resource, where the first resource does not overlap the second resource.

For ease of description, in the following descriptions, an RE is used to represent a resource unit, and an OFDM symbol (referred to as a "symbol" for short) is used to represent a time unit.

The first resource and the second resource are time-frequency resources on the physical channel. That the first resource does not overlap the second resource means that at least a part of the one or more REs included in the first resource does not overlap at least a part of the one or more REs included in the second resource, in other words, the REs included in the first resource and the REs included in the second resource do not overlap partially or completely. Because the first resource does not overlap the second resource, an information block to which modulation symbols carried in each of the first resource and the second resource correspond is identified. In addition, in some embodiments, in this embodiment, a quantity of spatial resources, namely, layers, corresponding to the physical channel is not limited, and a manner in which a modulation symbol is mapped to a layer of the physical channel before being mapped to a time-frequency resource is not limited. For example, the manner described in embodiments shown in FIG. 3 to FIG. 5 is used, or a mapping manner in a conventional technology is used. This is not limited in some embodiments. In some embodiments, the quantity of layers corresponding to the physical channel is related to a quantity of modulation symbols that is carried on each RE. Usually, one RE is used to map X modulation symbols, where X is the quantity of layers of the physical channel, and $X \geq 1$. For example, in response to the physical channel corresponding to one layer, one RE carries one modulation symbol. In response to the physical channel corresponding to two layers, one RE carries two modulation symbols.

Optionally, in an implementation of the embodiments, a position of the first resource is related to a demodulation reference signal (demodulation reference signal, DMRS) corresponding to the physical channel.

The communication device maps the first modulation symbols to the first resource, and map the second modulation symbols to the second resource based on a resource occupied by at least one DMRS corresponding to the physical channel.

A quantity of DMRSs corresponding to the physical channel is configured by the network device, and a time domain position of the at least one DMRS is related to a time domain resource mapping manner of the physical channel. For example, the physical channel is a PDSCH, and one DMRS is configured. In response to a time domain resource mapping manner of the PDSCH being a manner A (typeA), a reference point/of the DMRS in time domain is a start OFDM symbol in a slot. In response to a time domain resource mapping manner of the PDSCH being a manner B (typeB), a reference point/of the DMRS in time domain is a start OFDM symbol of a scheduled PDSCH resource. The reference point/is the 1st OFDM symbol of the DMRS in time domain. In other words, a time domain position of the DMRS starts from the reference point l. A resource occupied by a DMRS includes one or more OFDM symbols in time domain and a frequency domain unit corresponding to each OFDM symbol.

Optionally, a difference between a start time unit index of the first resource and a start time unit index of a first DMRS is less than a difference between a start time unit index of the second resource and the start time unit index of the first DMRS, where the first DMRS is a demodulation reference signal with a smallest start time unit index in the at least one DMRS corresponding to the physical channel.

The communication device maps the first modulation symbols to the first resource, and map the second modulation symbols to the second resource based on a resource occupied by the first DMRS, where the first DMRS has a smallest start symbol index in the at least one DMRS, and a difference between a start symbol index of the first resource and a start symbol index of the first DMRS is less than or equal to a difference between a start symbol index of the second resource and the start symbol index of the first DMRS. The communication device maps the first information block to a time domain position adjacent to a DMRS whose time domain position is the first in the at least one DMRS. A position closer to the DMRS indicates more accurate channel estimation, so that a reliability condition of service information with high reliability is met.

Optionally, in response to the difference between the start symbol index of the first resource and the start symbol index of the first DMRS being equal to the difference between the start symbol index of the second resource and the start symbol index of the first DMRS, a difference between a symbol index of an end position of the first resource and the start symbol index of the first DMRS is less than a difference between a symbol index of an end position of the second resource and the start symbol index of the first DMRS.

A mapping manner of the first resource is described with reference to the following FIG. 7 to FIG. 10. In some embodiments, in the following FIG. 7 to FIG. 10, a horizontal direction refers to time domain, and a time domain unit is an OFDM symbol; and a vertical direction refers to frequency domain, and a frequency domain unit is a subcarrier. One slot includes 12 OFDM symbols (a symbol 0 to a symbol 11), and one OFDM symbol includes 12 subcarriers. Correspondingly, one OFDM symbol includes 12 REs. Each grid in FIG. 7 to FIG. 10 represents one RE. For example, one modulation symbol is mapped to each RE is assumed. Details are not described again below.

Figure 7:
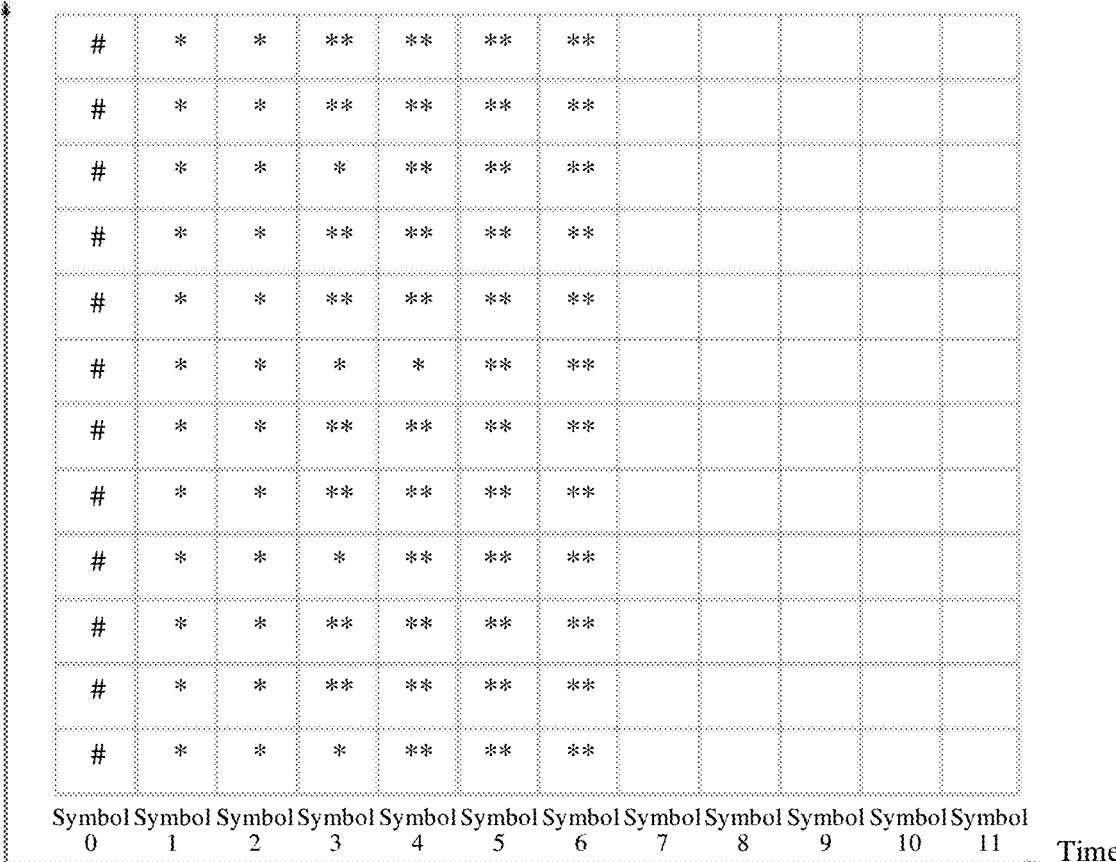
FIG. 7 is a schematic diagram of mapping a modulation symbol to a time-frequency resource according to some embodiments.

In response to the physical channel corresponding to one DMRS, the communication device maps the first information block to a time domain position closest to a start symbol of the DMRS, for example, maps the first information block to an adjacent symbol. As shown in FIG. 7, a start time domain position of the DMRS is a symbol 0, and the DMRS occupies REs on the symbol 0. A start time domain position of the first information block is a symbol 1. A start time domain position of the second information block is a symbol 3. A distance between the start time domain position of the time-frequency resource occupied by the first information block and the start time domain position of the DMRS is less than a distance between the start time domain position of the time-frequency resource occupied by the second information block and the start time domain position of the DMRS.

In response to the physical channel corresponding to two or more DMRSs, the communication device maps the first information block to a time domain position closest to a DMRS with a minimum start symbol index, for example, an adjacent symbol. As shown in FIG. 8, a start time domain position of a DMRS #1 is a symbol 0, a start time domain position of a DMRS #2 is a symbol 7, a start time domain position of the first information block is a symbol 1, and a start time domain position of the second information block is a symbol 3. In some embodiments, the first information block and the second information block are mapped based on a time domain position of the DMRS #1, and is irrelevant to a time domain position of the DMRS #2. In this way, a receiving end decodes the first information block. This is applicable to a scenario in which the first information block is delay-sensitive service information.

In an implementation of the embodiments, the communication device determines that the first resource used to map the first information block includes X REs, $$X \geq \sum_{i=l_0}^{l_1} M_i, \text{ and } X < \sum_{i=l_0}^{l_1+1} M_i,$$

where $l_0$ represents an index of a start symbol that is in a time domain resource of the physical channel and that is available for transmission of the first information block; $M_i$ represents a quantity of REs that are available for transmission of the first information block and that are on an $i^{th}$ symbol used to transmit the first information block, where for example, one symbol in FIG. 8 corresponds to 12 REs; $l_1$ represents an index of a first symbol used to transmit the first information block; the first symbol has a largest index in at least one symbol whose REs that are available for transmission of the first information block are occupied by the first information block; and i and $M_i$ are integers greater than or equal to 0. In some embodiments, the first information block occupies REs that are available for transmission of the first information block and that are on an $l_0{}^{th}$ symbol to an $l_1{}^{th}$ symbol, and REs on the $1^{st}$ symbol (namely, an $(l_1+1)^{th}$ symbol) after the first symbol is used to carry a remaining first modulation symbol corresponding to the first information block. Optionally, in response to the first resource being determined based on the time domain position of the DMRS, $l_0$ represents an index of a start symbol that is closest to the time domain position of the DMRS and that is used to transmit the first information block.

A meaning of the REs that are available for transmission of the first information block is: A part of REs included in one symbol is unable to be used to transmit the first information block. For example, the part of REs is used to transmit a DMRS or other data. Alternatively, the part of REs is unable to be used to transmit the first information block is specified by the network device. For example, one symbol corresponds to 12 REs, and six REs are used to transmit a DMRS. In this case, six REs are available for transmission of the first information block.

Optionally, the first resource includes two or more consecutive REs on the $(l_1+1)^{th}$ symbol. That is, for example, a plurality of consecutively arranged REs are selected in ascending order of frequencies. Indexes of the consecutive REs are consecutive. Indexes of REs on a same symbol is represented by indexes of subcarriers on the symbol, and the indexes of the REs are numbered in ascending or descending order of subcarrier frequencies.

Optionally, the first resource includes two or more REs on the $(l_1+1)^{th}$ symbol, and at least two adjacent REs in the two or more REs are discrete. In other words, REs, on the $(l_1+1)^{th}$ symbol, used to transmit the first modulation symbols are not consecutively arranged, and at least two adjacent REs used to transmit the first modulation symbols are not consecutively arranged. The REs, on the $(l_1+1)^{th}$ symbol, carrying the first modulation symbols are evenly distributed on a frequency band of the entire symbol as much as possible, so that a higher frequency diversity gain is obtained.

For example, there is an interval d between any two adjacent REs in the two or more REs, and d is an integer greater than or equal to 1. In addition, d is a difference between indexes of the two REs, or is a quantity of REs between the two adjacent REs. In response to the interval d being the difference between the indexes of the two REs, the interval d is calculated according to the following formula: d=floor(a(l)/b), where a(l) represents a quantity of available REs on the $(l_1+1)^{th}$ symbol, b represents a quantity of REs, on the $(l_1+1)^{th}$ symbol, occupied by the first information block, and floor represents rounding down. Alternatively, the interval d is configured by the network device. Optionally, the communication device equally groups the REs on the $(l_1+1)^{th}$ symbol into a plurality of groups, where one RE in each of the at least one group of REs is used to map one first modulation symbol, and there is an interval d between the REs used to map the first modulation symbols.

Figure 9:
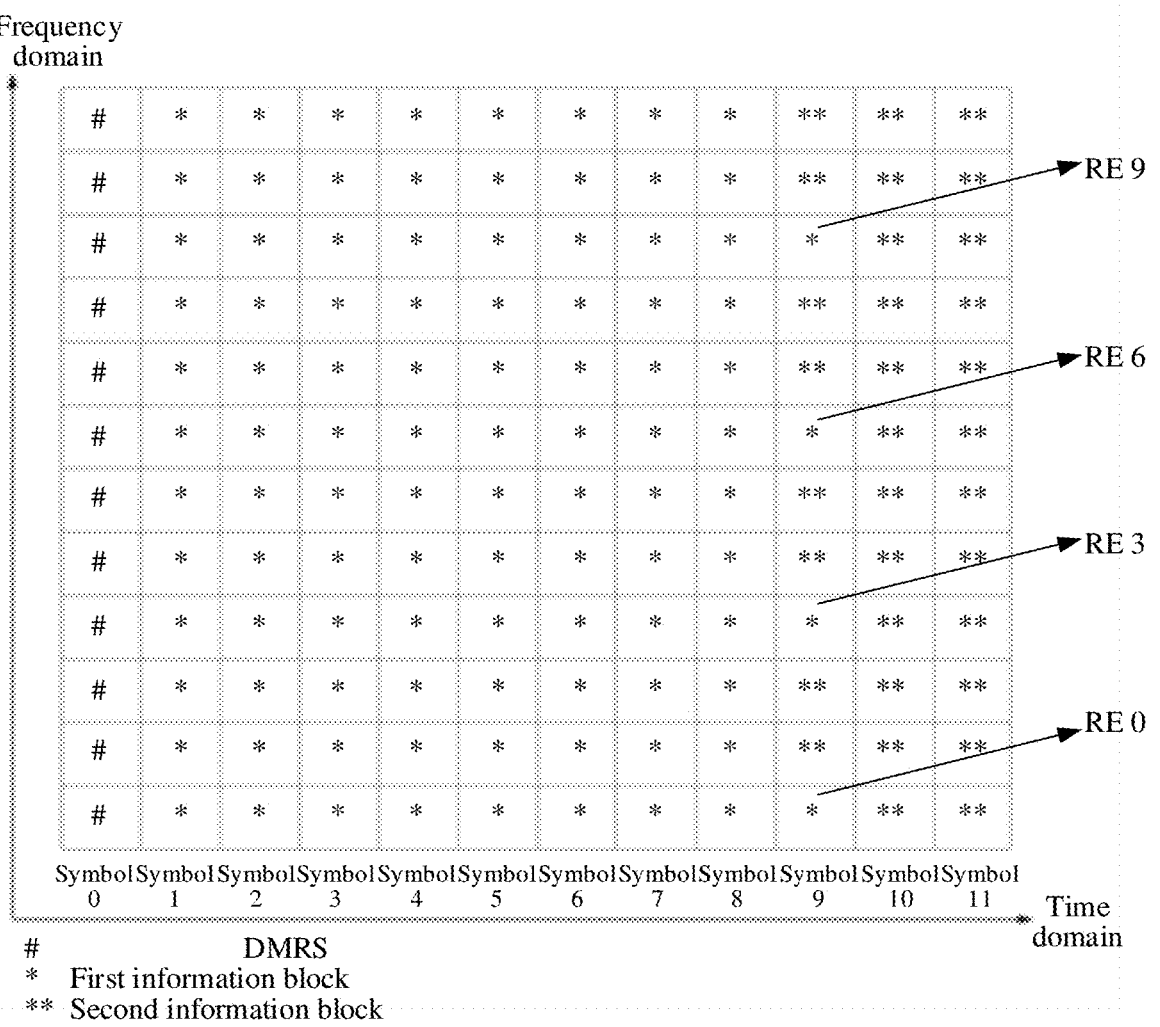
FIG. 9 is a schematic diagram of mapping a modulation symbol to a time-frequency resource according to some embodiments.

A process of determining the first resource is described by using an example. 100 REs are called to transmit the first information block, and a quantity of REs, on each symbol, that are available for transmission of the first information block is 12 is assumed. In this case, floor(100/12)=8. ADMRS is located on a symbol 0. Therefore, the first information block occupies a total of 96 (12×8) REs corresponding to a symbol 1 to a symbol 8, and additionally occupy four REs on a symbol 9. Further, the four REs are selected from 12 REs corresponding to the symbol 9. Optionally, the four REs are consecutively arranged. Optionally, the 12 REs are equally divided into four groups, and one of three REs in each group is allocated to the first information block. In response to an interval between the four REs being calculated according to a formula d=floor (a(l)/b), where a(l)=12, and b=4, d=3. As shown in FIG. 9, the first information block occupies an RE 0, an RE 3, an RE 6, and an RE 9 on the symbol 9, and remaining REs on the symbol 9 is used to map the second information block. Not shown in FIG. 9, the first information block alternatively occupies an RE 1, an RE 4, an RE 7, and an RE 10 on the symbol 9. A start RE occupied by the first information block is determined by the network device and indicated to the UE. Not shown in FIG. 9, in response to the first information block additionally occupying five REs on the symbol 8, that is, in response to b=5, d=floor(12/5)=2. Details are not described again.

Optionally, in an implementation of the embodiments, the communication device groups REs that call to be occupied by the first information block into Y groups, where a value of Y is the same as a quantity of DMRSs corresponding to the physical channel, and Y≥2. A difference between a start symbol index corresponding to one group of REs in the Y groups of REs and a start symbol index of one (referred to as a second DMRS below) of the Y DMRSs is less than a difference between a start symbol index corresponding to any other group of REs in the Y groups of resource units and the start symbol index of the second DMRS. In other words, a time domain position of each group of REs is closest to a time domain position of one of the Y DMRSs. In this way, the communication device maps the first information block to a resource close to each DMRS.

The communication device maps, based on a position of the second DMRS, one or more first modulation symbols corresponding to one group of REs in the Y groups. In addition, a difference between the start symbol index of the second DMRS and a start symbol index corresponding to the group of REs is less than a difference between the start symbol index of the second DMRS and a start symbol index corresponding to any other group of REs in the Y groups of REs.

In an example, assuming that the first information block corresponds to 28 modulation symbols, the first information block calls for a resource corresponding to 28 REs (in this case, a quantity of layers corresponding to the physical channel is 1 is assumed). The 28 REs are evenly divided into two groups. A first group of REs is used to map 14 modulation symbols, and a second group of REs is used to map 14 modulation symbols. As shown in FIG. 10, the physical channel corresponds to a DMRS #1 and a DMRS #2. A time domain position of the DMRS #1 is located on a symbol 0, and the DMRS #2 is located on a symbol 7. The start time domain position of the first group of REs is located on the symbol 1 adjacent to the DMRS #1, and a start time domain position of the second group of REs is located on a symbol 8 adjacent to the DMRS #2.

The following describes a manner of grouping REs that call to be occupied by the first information block. In a possible manner, the REs called by the first information block are equally divided into Y groups, where a quantity of REs included in each group is n=floor(T/Y), T represents a total quantity of REs that call to be occupied, and floor represents rounding down. In response to T/Y not being an integer, remaining REs are sequentially allocated according to an order of time domain positions of the Y groups of REs. Assuming that the physical channel corresponds to two DMRSs, and T=101, there is two groups of REs, that is, Y=2. In this case, n=floor(101/2)=50. A remaining RE is allocated to a first group of REs, so that the first group of REs includes 51 REs, and a second group of REs includes 50 REs. In response to the physical channel corresponding to three DMRSs, and T=101, there is three groups of REs, that is, Y=3. In this case, n=floor(101/3)=33. Remaining two REs are allocated to a first group of REs and a second group of REs, so that the first group of REs includes 34 REs, the second group of REs includes 34 REs, and a third group of REs includes 33 REs. Because a quantity of REs in each group is as average as possible, a quantity of first modulation symbols, corresponding to the first information block, mapped to each group of REs further is as average as possible, so that a higher time domain diversity gain is obtained. In addition, because a quantity of REs in each group is as average as possible, the REs occupied by the first information block is as close as possible to the DMRSs. In this way, accurate channel information is obtained, so that data transmission reliability is improved.

In some embodiments, each group of REs is located at a resource position closest to a DMRS corresponding to the group of REs, so that the entire first information block is mapped to the resource position closest to each DMRS, improving decoding accuracy of the first information block. In some embodiments, REs in each group are continuously distributed in time domain or frequency domain. This is not limited in some embodiments, and depends on distribution of REs that are available for transmission of the first information block and that are in REs on each symbol on the physical channel.

Optionally, each group of REs includes Z REs, $$Z \geq \sum_{i=group(l_0)}^{group(l_1)} M_i, \text{ and } Z < \sum_{i=group(l_0)}^{group(l_1+1)} M_i,$$

where group ($l_0$) represents an index of a start symbol corresponding to each group of REs; $M_i$ represents a quantity of REs, on an $i^{th}$ symbol, in the group of REs; the Z REs includes REs that are on at least one symbol and that is used to transmit the first information block; group (i) represents an index of a first symbol corresponding to the group of REs; the first symbol has a largest index in the at least one symbol; and i and $M_i$ are integers greater than or equal to 0. In other words, the Z REs in each group of REs includes REs that are on a group $(l_0)^{th}$ symbol to a group $(l_1)^{th}$ symbol and that is used to transmit the first information block, and consecutive or discrete REs including the $1^{st}$ symbol (namely, the group $(l_1+1)^{th}$ symbol) after the first symbol. For a process of mapping the first modulation symbols in each group of REs, refer to the foregoing related content. Details are not described again.

Optionally, in an implementation of the embodiments, whether the physical channel corresponds to a DMRS is not considered, and the first resource is related to a start symbol of a time domain resource of the physical channel. A difference between a start time unit index of the first resource and a start time unit index of the time domain resource of the physical channel is less than a difference between a start time unit index of the second resource and the start time unit index of the time domain resource of the physical channel.

The communication device maps the first modulation symbols to the first resource, and map the second modulation symbols to the second resource based on the start symbol of the time domain resource of the physical channel, where a difference between a start symbol index of the first resource and a start symbol index of the time domain resource of the physical channel is less than or equal to a difference between a start symbol index of the second resource and the start symbol index of the time domain resource of the physical channel. In response to the difference between the start symbol index of the first resource and the start symbol index of the time domain resource of the physical channel being equal to the difference between the start symbol index of the second resource and the start symbol index of the time domain resource of the physical channel, a difference between a symbol index of an end position of the first resource and the start symbol index of the time domain resource of the physical channel is less than a difference between a symbol index of an end position of the second resource and the start symbol index of the time domain resource of the physical channel. In other words, the first information block is mapped to a resource position closest to the start symbol by using the start symbol as a reference, so that the first information block is mapped to a front position in time domain. In this way, the first information block is processed. This is applicable to a delay-sensitive service. A mapping manner is similar to the foregoing manner of mapping the first information block and the second information block based on the resource occupied by the DMRS. Details are not described again.

Optionally, in an implementation of the embodiments, the communication device maps the first information block to the first resource, and then map the second information block to the second resource. after the communication device maps, in the foregoing mapping manner, the first modulation symbols included in the first information block to the REs included in the first resource, a remaining RE that is on the physical channel and that is used to transmit the information block is used to map the second modulation symbols included in the second information block. Further, according to a predetermined order, the first modulation symbols or the second modulation symbols are mapped to REs (referred to as "available REs" for short) that are on each symbol and that is used to transmit the information block. For example, sorting is performed first in frequency domain and then in time domain, including mapping, based on available REs on a same symbol, the first modulation symbols in ascending order of subcarrier frequencies in frequency domain; and after the first modulation units are mapped to the available REs on the symbol, in response to there still being a remaining to-be-mapped first modulation symbol, mapping, based on available REs on a next symbol in a time order, the first modulation symbol according to a frequency order. Details are not described again. For another example, sorting is performed first in time domain and then in frequency domain, including mapping, based on available REs corresponding to a same subcarrier (for example, a subcarrier with a lowest frequency), the first modulation symbols according to a sequential time order of the symbols in time domain; and after the first modulation units are mapped to the available REs corresponding to the subcarrier, in response to there still being a remaining to-be-mapped first modulation symbol, mapping, based on available REs corresponding to a next subcarrier (for example, a subcarrier with a higher frequency), the first modulation symbol according to a time order of the symbols. Details are not described again.

In the resource mapping manner provided in some embodiments, the UE or the network device independently codes and modulates the first information block and the second information block that are transmitted through the same physical channel, and maps the first modulation symbols and the second modulation symbols that are obtained through coding and modulation to the non-overlapping time-frequency resources, so that the first information block and the second information block is distinguished from each other. In this solution, a spatial resource status of the UE or the network device does not call to be considered, so that transmission, of a plurality of information blocks having different performance conditions, on one physical channel is more flexibly supported. In addition, the high-priority information block is mapped to the resource position close to the DMRS, so that transmission quality of high-priority service information is improved.

In some embodiments, the resource mapping method described in FIG. 3 to FIG. 10 is described from a perspective of the transmitting end during uplink transmission or downlink transmission. For example, in the uplink transmission process, the UE serving as the transmitting end sends the first information block or the second information block to the network device by performing foregoing method. In the downlink transmission process, the network device serving as the transmitting end sends the first information block or the second information block to the UE by performing the foregoing method. Correspondingly, regardless of the uplink transmission process or the downlink transmission process, the receiving end receives the signals and perform demodulation and decoding according to a same resource mapping rule of the transmitting end, to obtain the first information block and the second information block. With reference to FIG. 11 and FIG. 12, the following describes an information receiving method of the receiving end. In some embodiments, in the following embodiments shown in FIG. 11 and FIG. 12, the communication device is the receiving end of the first information block and the second information block, and is a network device in the uplink transmission process or UE in the downlink transmission process. In addition, the communication device alternatively is an apparatus, for example, a chip, used in the UE or the network device. Details are not described below.

As shown in FIG. 11, the method includes the following steps.

S1101: The communication device receives M modulation symbols through a same physical channel, where the M modulation symbols correspond to a first information block and a second information block, the physical channel includes N spatial resources, and there is a mapping relationship between the M modulation symbols and the N spatial resources.

The first information block and the second information block are independently coded and modulated, and then transmitted to the communication device through the same physical channel. For detailed descriptions of the physical channel and the first information block/second information block, refer to related content in the foregoing embodiments shown in FIG. 3 to FIG. 10. Details are not described again.

S1102: The communication device obtains, based on the mapping relationship, one or more first modulation symbols that are in the M modulation symbols and that correspond to the first information block, and one or more second modulation symbols that are in the M modulation symbols and that correspond to the second information block.

Because a transmitting end determines the mapping relationship between the M to-be-sent modulation symbols and the N spatial resources of the physical channel, the communication device serving as a receiving end identifies, in the M modulation symbols based on the mapping relationship, the modulation symbols corresponding to the first information block and the modulation symbols corresponding to the second information block, and then independently demodulate and decode the modulation symbols corresponding to the first information block and the second information block. In this way, the first information block and the second information block are received.

Optionally, a priority of the first information block is higher than a priority of the second information block. For descriptions about the priority, refer to related content in the foregoing embodiments shown in FIG. 3 to FIG. 10. Details are not described again.

It is assumed that the first information block corresponds to P first modulation symbols, the second information block corresponds to Q second modulation symbols, and M=P+Q, where P and Q are integers greater than or equal to 1. That there is a mapping relationship between the M modulation symbols and the N spatial resources includes: mapping the P first modulation symbols to at least two spatial resources in the N spatial resources; and mapping the Q second modulation symbols to a part or all of the at least two spatial resources. In other words, at least one modulation signal corresponding to the first information block and at least one modulation signal corresponding to the second information block are mapped to a same spatial resource. For detailed descriptions, refer to related content in the foregoing embodiment shown in FIG. 3. Details are not described again.

Optionally, the M modulation symbols are mapped to the N spatial resources through cross mapping. An $(N \times i + k)^{th}$ modulation symbol in the M modulation symbols are mapped to a position of an $i^{th}$ modulation symbol in a $j^{th}$ spatial resource in the N spatial resources according to Formula (1). For detailed descriptions, refer to related content in the foregoing embodiment shown in FIG. 3. Details are not described again.

Optionally, the mapping relationship between the M modulation symbols and the N spatial resources is determined by the communication device according to a spatial resource mapping order. In an uplink transmission process, the UE determines the mapping relationship according to the spatial resource mapping order indicated by the network device. In a downlink transmission process, the network device maps the M modulation symbols to the N spatial resources according to the mapping order determined by the network device.

The mapping order includes: mapping the modulation symbols corresponding to the first information block to a first spatial resource, where the first spatial resource belongs to the N spatial resources, and is determined by the network device. For detailed descriptions of the mapping order, refer to related content in the embodiment shown in FIG. 3. Details are not described again.

According to the foregoing method, the UE or the network device identifies, based on the mapping relationship between the modulation symbols transmitted on the same physical channel and the spatial resources of the physical channel, modulation symbols corresponding to different information blocks, to complete a process of receiving the different information blocks transmitted on the same physical channel. Performance conditions of different services are considered, so that reliability of service information transmission is improved.

As shown in FIG. 12, the method includes the following steps.

S1201: The communication device receives one or more first modulation symbols and one or more second modulation symbols through a same physical channel, where the first modulation symbols are carried on a first resource of the physical channel, the second modulation symbols are carried on a second resource of the physical channel, and the first resource does not overlap the second resource.

That the first resource does not overlap the second resource means that at least a part of one or more resource units included in the first resource does not overlap at least a part of one or more resource units included in the second resource.

S1202: The communication device obtains a first information block corresponding to the first modulation symbols and a second information block corresponding to the second modulation symbols.

because the resource carrying the first modulation symbols does not overlap the resource carrying the second modulation symbols, the communication device identifies, based on different resource positions, that the first modulation symbols correspond to the first information block and the second modulation symbols correspond to the second information block. In this way, the first modulation symbols and the second modulation symbols are independently demodulated and decoded to obtain the first information block and the second information block.

For detailed descriptions of the physical channel and the first information block/second information block, refer to related content in the foregoing embodiment. Details are not described again.

Optionally, a priority of the first information block is higher than a priority of the second information block. For descriptions about the priority, refer to related content in the foregoing embodiment. Details are not described again.

In an implementation of the embodiments, the first resource and the second resource are determined based on a resource occupied by at least one DMRS corresponding to the physical channel. A quantity of DMRSs corresponding to the physical channel is configured by the network device, and a time domain position of the at least one DMRS is related to a time domain resource mapping manner of the physical channel. For descriptions of the DMRS, refer to related content in the embodiment shown in FIG. 6. Details are not described again.

The first resource is determined based on a time domain position of a first DMRS in the at least one DMRS. For detailed descriptions of the first DMRS, refer to the first DMRS in the embodiment shown in FIG. 6. Details are not described again.

In an implementation of the embodiments, the first resource includes X resource units, $$X \geq \sum_{i=l_0}^{l_1} M_i, \text{ and } X < \sum_{i=l_0}^{l_1+1} M_i,$$

where the first resource includes two or more consecutive resource units on an $(l_1+1)^{th}$ time unit, or the first resource includes two or more discrete resource units on an $(l_1+1)^{th}$ time unit. Optionally, there is an interval d between any two adjacent resource units in the two or more discrete resource units, $d \geq 1$, and d is an integer. For a manner of determining the first resource, including positions of the resource units included in the first resource, the interval d, and the like, refer to related content in the embodiment shown in FIG. 6. Details are not described again.

In an implementation of the embodiments, a position of the first resource is determined based on time domain positions of two or more DMRSs. resource units that call to be occupied by the first information block is grouped into Y groups, where a value of Y is the same as a quantity of DMRSs corresponding to the physical channel, and $Y \geq 2$. A time domain position of each group of resource units is closest to a time domain position of one of the Y DMRSs. For a manner of determining a position of each group of resource units, refer to related content in the embodiment shown in FIG. 6. Details are not described again.

In an implementation of the embodiments, the first resource and the second resource is determined based on a start time unit of the time domain resource of the physical channel. Refer to related descriptions in the embodiment shown in FIG. 6. Details are not described again.

According to the foregoing method, the UE or the network device receives, by using the non-overlapping resources on the same physical channel, the modulation symbols corresponding to the first information block and the second information block, to identify modulation symbols corresponding to different information blocks, and complete a process of receiving the different information blocks transmitted on the same physical channel. Performance conditions of different services are considered, so that reliability of service information transmission is improved.

An embodiment of the embodiments further provides a communication apparatus configured to implement any one of the foregoing methods. For example, a communication apparatus is provided, and includes units (or means) configured to implement the steps performed by the communication device in any one of the foregoing methods. For example, FIG. 13 is a schematic diagram of a communication apparatus according to some embodiments. The communication apparatus is configured to perform actions of the communication device in the foregoing method embodiments. The communication apparatus 1300 includes a processing unit 1301 and a transceiver unit 1302.

In an implementation of the embodiments, the communication apparatus is a transmitting end in a data/signaling transmission process, and is UE in an uplink transmission process, a network device in a downlink transmission process, or an apparatus, for example, a chip, used in the UE or the network device.

Optionally, the processing unit 1301 is configured to: determine that a first information block corresponds to one or more modulation symbols; and determine that a second information block corresponds to one or more modulation symbols, where the first information block and the second information block are transmitted through a same physical channel, the first information block and the second information block correspond to a total of M modulation symbols, and the physical channel includes N spatial resources. The processing unit 1301 is further configured to map the M modulation symbols to the N spatial resources, where N and M are integers greater than or equal to 2.

Optionally, the processing unit 1301 is configured to: determine that a first information block corresponds to one or more first modulation symbols; and determine that a second information block corresponds to one or more second modulation symbols, where the first information block and the second information block are transmitted through a same physical channel. The processing unit 1301 is further configured to: map the first modulation symbols to a first resource, and map the second modulation symbols to a second resource, where the first resource does not overlap the second resource.

The transceiver unit 1302 is configured to transmit data or signaling. For example, in response to the communication device being a terminal device, the transceiver unit 1302 is configured to receive indication information of a spatial resource mapping order from a network device, and is further configured to receive indication information of an information block priority from the network device. In addition, the transceiver unit 1302 sends the first information block and the second information block to a receiving end. The transceiver unit 1302 sends the modulation symbols corresponding to the first information block and the second information block to the receiving end through the physical channel.

For detailed descriptions of the processing unit 1301 and the transceiver unit 1302 in this implementation, refer to related steps or operations performed by the communication device in the method embodiments shown in FIG. 3 to FIG. 10. Details are not described again.

In an implementation of the embodiments, the communication apparatus is a receiving end in a data/signaling transmission process, and is a network device in an uplink transmission process, UE in a downlink transmission process, or an apparatus, for example, a chip, used in the UE or the network device.

Optionally, the transceiver unit 1302 is configured to receive M modulation symbols through a same physical channel, where the M modulation symbols correspond to a first information block and a second information block, the physical channel includes N spatial resources, and there is a mapping relationship between the M modulation symbols and the N spatial resources. The processing unit 1301 is configured to obtain, based on the mapping relationship, one or more first modulation symbols that are in the M modulation symbols and that correspond to the first information block, and one or more second modulation symbols that are in the M modulation symbols and that correspond to the second information block.

Optionally, the transceiver unit 1302 is configured to receive one or more first modulation symbols and one or more second modulation symbols through a same physical channel, where the first modulation symbols are carried on a first resource of the physical channel, the second modulation symbols are carried on a second resource of the physical channel, and the first resource does not overlap the second resource. The processing unit 1301 is configured to obtain a first information block corresponding to the first modulation symbols and a second information block corresponding to the second modulation symbols.

For detailed descriptions of operations performed by the processing unit 1301 and the transceiver unit 1302 in this implementation, refer to related steps or operations performed by the communication device in the method embodiments shown in FIG. 11 and FIG. 12. Details are not described again.

In some embodiments, division into units in the foregoing apparatuses is logical function division. During implementation, all or some of the units are integrated into one physical entity, or is physically separate. In addition, the units in the apparatus is implemented by software invoked by a processing element, or is implemented by hardware; or some units are implemented by software invoked by a processing element, and some units are implemented by hardware. For example, each unit is a separately disposed processing element, or is integrated into a chip of the apparatus for implementation. In addition, each unit alternatively is stored in a memory in a form of a program to be invoked by a processing element of the apparatus to perform a function of the unit. In addition, some or all of the units are integrated together, or the units are implemented independently. The processing element herein further is referred to as a processor, and is an integrated circuit having a signal processing capability. In an implementation process, the steps in the foregoing methods or the foregoing units are implemented by using a hardware integrated logic circuit in the processing element, or is implemented by software invoked by the processing element.

FIG. 14 is a schematic diagram of a structure of a communication apparatus 1400 according to some embodiments. The communication apparatus 1400 shown in FIG. 14 is an implementation of a hardware circuit of the communication apparatus shown in FIG. 13. The communication apparatus 1400 is configured to implement a function of the communication device in the foregoing method embodiments shown in FIG. 3 to FIG. 12. For ease of description, FIG. 14 shows main components of the communication apparatus. As shown in FIG. 14, the communication apparatus 1400 includes a processor 1401 and a memory 1402. The processor 1401 is mainly configured to: process a communication protocol and communication data, control the entire communication apparatus, execute a software program, and process data of the software program. The memory 1402 is mainly configured to store the software program and the data. In addition, the communication apparatus 1400 further includes a transceiver 1403, an antenna 1404, and the like, configured to perform data or signaling communication with another communication device.

The processor 1401 executes the program stored in the memory 1402, to enable the communication apparatus 1400 to perform actions described in the foregoing method embodiments. For example, the processor 1401 is configured to determine that a first information block and a second information block that are transmitted through a same physical channel each correspond to one or more modulation symbols; and is further configured to map a total of M modulation symbols corresponding to the first information block and the second information block to N spatial resources of the physical channel, where N and M are integers greater than or equal to 2. For another example, the processor 1401 is configured to: determine that a first information block corresponds to one or more first modulation symbols; and determine that a second information block corresponds to one or more second modulation symbols; and is further configured to: map the first modulation symbols to a first resource, and map the second modulation symbols to a second resource, where the first resource does not overlap the second resource. For another example, the processor 1401 receives, through the transceiver 1403, M modulation symbols through a same physical channel, where the M modulation symbols correspond to a first information block and a second information block, the physical channel includes N spatial resources, and there is a mapping relationship between the M modulation symbols and the N spatial resources. The processor 1401 is config- ured to obtain, based on the mapping relationship, one or more first modulation symbols that are in the M modulation symbols and that correspond to the first information block, and one or more second modulation symbols that are in the M modulation symbols and that correspond to the second information block. For another example, the processor 1401 receives, through transceiver 1403, one or more first modu- lation symbols and one or more second modulation symbols through a same physical channel, where the first modulation symbols are carried on a first resource of the physical channel, the second modulation symbols are carried on a second resource of the physical channel, and the first resource does not overlap the second resource. The proces- sor 1401 is configured to obtain a first information block corresponding to the first modulation symbols and a second information block corresponding to the second modulation symbols.

Optionally, the communication apparatus is a network device, or is an apparatus, for example, a chip or a chip system, in the network device. The chip system includes at least one chip, and the chip system further includes another circuit structure and/or a discrete device.

Optionally, the communication apparatus is UE, or is an apparatus, for example, a chip or a chip system, in the UE. The chip system includes at least one chip, and the chip system further includes another circuit structure and/or a discrete device.

Optionally, in an implementation, the processor 1401 includes a logic circuit and an input interface and/or an output interface. For example, the output interface is con- figured to perform a sending action in a corresponding method, and the input interface is configured to perform a receiving action in the corresponding method.

For detailed descriptions of a function implemented by the communication apparatus 1400, refer to related steps or operations performed by the communication device in the method embodiments shown in FIG. 3 to FIG. 12. Details are not described again.

In another implementation, a program used to perform the methods performed by the UE or the network device is in a storage element that is on a different chip from the process- ing element, namely, an off-chip storage element. In this case, the processing element invokes or loads the program from the off-chip storage element to an on-chip storage element, to invoke and perform any method in the foregoing method embodiments.

In still another implementation, a unit used by the termi- nal device or the network device to implement the steps in the foregoing methods are configured as one or more pro- cessing elements. The processing element herein is an integrated circuit, for example, one or more ASICs, one or more DSPs, one or more FPGAs, or a combination of these types of integrated circuits. These integrated circuits are integrated together to form a chip.

The units for implementing the steps in the foregoing methods are integrated together and implemented in a form of a system-on-a-chip (system-on-a-chip, SOC). The SOC chip is configured to implement the foregoing methods. At least one processing element and a storage element is integrated into the chip, and the processing element invokes a program stored in the storage element to implement the foregoing methods performed by the terminal device or the network device. Alternatively, at least one integrated circuit is integrated into the chip, to implement the foregoing methods performed by the terminal device or the network device. Alternatively, with reference to the foregoing imple- mentations, functions of some units are implemented by a program invoked by the processing element, and functions of some units are implemented by the integrated circuit.

In another implementation, the communication apparatus provided in some embodiments includes at least one pro- cessing element and an interface circuit. The at least one processing element is configured to perform any method provided in the foregoing method embodiments. The pro- cessing element performs a part or all of steps performed by the terminal device or the network device in a first manner by invoking a program stored in a storage element; or performs a part or all of steps performed by the terminal device or the network device in a second manner by using a hardware integrated logic circuit in the processing element in combination with instructions; or certainly performs, by combining the first manner and the second manner, a part or all of steps performed by the terminal device or the network device. In some embodiments, the interface circuit is a transceiver or an input/output interface. Optionally, the communication apparatus further includes a memory, con- figured to store instructions executed by the foregoing processing element, input data called by the processing element to run instructions, or data generated after the processing element runs instructions.

As described above, the processing element herein is a general-purpose processor, for example, a CPU, or is one or more integrated circuits configured to implement the fore- going methods, for example, one or more ASICs, one or more microprocessors DSPs, one or more FPGAs, or a combination of at least two of the integrated circuits. The storage element is a memory, or is a general term of a plurality of storage elements.

A person skilled in the art is able to clearly understand that, for the purpose of convenient and brief description, for detailed working processes of the foregoing communication apparatus and the units or modules in the apparatus, refer to corresponding processes in the foregoing method embodi- ments. Details are not described herein again.

A person skilled in the art is able to understand that embodiments are provided as a method, a system, or a computer program product. Therefore, the embodiments is able to use a form of hardware embodiments, software embodiments, or embodiments with a combination of soft- ware and hardware. In addition, the embodiments is able to use a form of a computer program product that is imple- mented on one or more computer-usable storage media (including but not limited to a disk memory, an optical memory, and the like) that include computer-usable program code.

The embodiments are described with reference to the flowcharts and/or block diagrams of the method, the device (system), and the computer program product according to the embodiments. In some embodiments, computer program instructions are used to implement each procedure and/or each block in the flowcharts and/or the block diagrams and a combination of a procedure and/or a block in the flow- charts and/or the block diagrams. These computer program instructions are provided for a general-purpose computer, a dedicated computer, an embedded processor, or a processor of another programmable data processing device to generate a machine, so that the instructions executed by the computer or the processor of the another programmable data processing device generate an apparatus for implementing a function in one or more procedures in the flowcharts and/or in one or more blocks in the block diagrams.

These computer program instructions alternatively is stored in a computer-readable memory that indicates a computer or another programmable data processing device to work in a manner, so that the instructions stored in the computer-readable memory generate an artifact that includes an instruction apparatus. The instruction apparatus implements a function in one or more procedures in the flowcharts and/or in one or more blocks in the block diagrams.

What is claimed is:

1. A resource mapping method for a communication device, comprising:

determining whether a first information block corresponds to one or more modulation symbols;

determining whether a second information block corresponds to the one or more modulation symbols, wherein:

the first information block and the second information block are transmitted through a same physical channel, and the same physical channel corresponds to at least one demodulation reference signal (DMRS);

the first information block and the second information block correspond to a total of M modulation symbols; and the same physical channel includes N spatial resources; and mapping the M modulation symbols to the N spatial resources, wherein N and M are integers greater than or equal to 2, wherein a difference between a start time unit index of a first resource carrying modulation symbols corresponding to the first information block and a start time unit index of a first DMRS is less than a difference between a start time unit index of a second resource carrying modulation symbols corresponding to the second information block and the start time unit index of the first DMRS, wherein the first DMRS is a demodulation reference signal with a smallest start time unit index in the at least one DMRS.

2. The method according to claim 1, wherein:

the first information block corresponds to P first modulation symbols;

the second information block corresponds to Q second modulation symbols;

P is an integer greater than or equal to 2;

Q is an integer greater than or equal to 1; and

M is a sum of P and Q; and the mapping the M modulation symbols to the N spatial resources comprises:

mapping the P first modulation symbols to at least two spatial resources in the N spatial resources; and mapping the Q second modulation symbols to a part or all the at least two spatial resources.

3. The method according to claim 1, wherein:

the mapping the M modulation symbols to the N spatial resources comprises:

mapping an $(N \times i+k)^{th}$ modulation symbol in the M modulation symbols to a position of an $i^{th}$ modulation symbol in a $j^{th}$ spatial resource in the N spatial resources according to the following formula:

$$x^{(j)}(i)=d(N \times i+k),$$

wherein i, j, and k are integers greater than or equal to 0, i≤(M/N–1), j≤(N–1), and k≤(N–1).

4. The method according to claim 1, wherein:

the first information block corresponds to X first modulation symbols, X≥N; and each of the N spatial resources includes at least one first modulation symbol; or the first information block corresponds to the X first modulation symbols, X<N; and each of X spatial resources in the N spatial resources includes the at least one first modulation symbol.

5. The method according to claim 1, wherein:

the mapping the M modulation symbols to the N spatial resources is determined according to a spatial resource mapping order indicated by a network device.

6. The method according to claim 5, wherein:

the spatial resource mapping order includes:

mapping the modulation symbols corresponding to the first information block to a first spatial resource, wherein the first spatial resource belongs to the N spatial resources, and is determined by the network device.

7. The method according to claim 1, wherein a first information block priority is greater than a second information block priority.

8. A communication device, comprises:

at least one processor; and at least one memory in communication with the at least one processor that is configured, upon execution of instructions stored in the at least one memory, to cause the communication device to:

receive M modulation symbols through a same physical channel, wherein, and the same physical channel corresponds to at least one demodulation reference signal (DMRS) and:

the M modulation symbols correspond to a first information block and a second information block;

the same physical channel includes N spatial resources; and there is a mapping relationship between the M modulation symbols and the N spatial resources; and obtain, based on the mapping relationship, one or more first modulation symbols that are in the M modulation symbols that correspond to the first information block, and one or more second modulation symbols that are in the M modulation symbols that correspond to the second information block, wherein a difference between a start time unit index of a first resource carrying modulation symbols corresponding to the first information block and a start time unit index of a first DMRS is less than a difference between a start time unit index of a second resource carrying modulation symbols corresponding to the second information block and the start time unit index of the first DMRS, wherein the first DMRS is a demodulation reference signal with a smallest start time unit index in the at least one DMRS.

9. The communication device according to claim 8, wherein:

the first information block corresponds to P first modulation symbols;

the second information block corresponds to Q second modulation symbols;

P is an integer greater than or equal to 2;

Q is an integer greater than or equal to 1; and

M is a sum of P and Q; and the mapping relationship between the M modulation symbols and the N spatial resources includes:

the P first modulation symbols are mapped to at least two spatial resources in the N spatial resources; and the Q second modulation symbols are mapped to a part or all the at least two spatial resources.

10. The communication device according to claim 8, wherein:

the mapping relationship between the M modulation symbols and the N spatial resources includes:

an $(N\times i+k)^{th}$ modulation symbol in the M modulation symbols are mapped to a position of an $i^{th}$ modulation symbol in a $j^{th}$ spatial resource in the N spatial resources according to the following formula:

$$x^{(j)}(i)=d(N\times i+k),$$

wherein i, j, and k are integers greater than or equal to 0, $i\leq(M/N-1)$, $j\leq(N-1)$, and $k\leq(N-1)$.

11. The communication device according to claim 8, wherein:

the first information block corresponds to X first modulation symbols, $X\geq N$, and each of the N spatial resources includes at least one first modulation symbol; or the first information block corresponds to the X first modulation symbols, $X<N$, and each of X spatial resources in the N spatial resources includes the at least one first modulation symbol.

12. The communication device according to claim 8, wherein:

the mapping relationship between the M modulation symbols and the N spatial resources is determined according to a spatial resource mapping order indicated by a network device.

13. The communication device according to claim 12, wherein:

the spatial resource mapping order includes:

mapping modulation symbols corresponding to the first information block to a first spatial resource, wherein the first spatial resource belongs to the N spatial resources, and is determined by the network device.

14. The communication device according to claim 12, wherein:

a first information block priority is greater than a second information block priority.

15. A communication device, comprises:

at least one processor; and at least one memory in communication with the at least one processor that is configured, upon execution of instructions stored in the at least one memory, to cause the communication device to:

determine whether a first information block corresponds to one or more modulation symbols;

determine whether a second information block corresponds to the one or more modulation symbols, wherein:

the first information block and the second information block are transmitted through a same physical channel, and the same physical channel corresponds to at least one demodulation reference signal (DMRS);

the first information block and the second information block correspond to a total of M modulation symbols; and the same physical channel includes N spatial resources; and map the M modulation symbols to the N spatial resources, wherein N and M are integers greater than or equal to 2, wherein a difference between a start time unit index of a first resource carrying modulation symbols corresponding to the first information block and a start time unit index of a first DMRS is less than a difference between a start time unit index of a second resource carrying modulation symbols corresponding to the second information block and the start time unit index of the first DMRS, wherein the first DMRS is a demodulation reference signal with a smallest start time unit index in the at least one DMRS.

16. The communication device according to claim 15, wherein:

the first information block corresponds to P first modulation symbols;

the second information block corresponds to Q second modulation symbols;

P is an integer greater than or equal to 2;

Q is an integer greater than or equal to 1; and

M is a sum of P and Q; and the mapping the M modulation symbols to the N spatial resources comprises:

map the P first modulation symbols to at least two spatial resources in the N spatial resources; and map the Q second modulation symbols to a part or all the at least two spatial resources.

17. The communication device according to claim 15, wherein:

the mapping the M modulation symbols to the N spatial resources comprises:

map an $(N\times i+k)^{th}$ modulation symbol in the M modulation symbols to a position of an $i^{th}$ modulation symbol in a $j^{th}$ spatial resource in the N spatial resources according to the following formula:

$$x^{(j)}(i)=d(N\times i+k),$$

wherein i, j, and k are integers greater than or equal to 0, $i\leq(M/N-1)$, $j\leq(N-1)$, and $k\leq(N-1)$.

18. The communication device according to claim 15, wherein:

the first information block corresponds to X first modulation symbols, $X\geq N$, and each of the N spatial resources includes at least one first modulation symbol, or the first information block corresponds to the X first modulation symbols, $X<N$, and each of X spatial resources in the N spatial resources includes the at least one first modulation symbol.

19. The communication device according to claim 15, wherein:

the mapping the M modulation symbols to the N spatial resources is determined according to a spatial resource mapping order indicated by a network device.

20. The communication device according to claim 19, wherein:

the spatial resource mapping order includes:

map the modulation symbols corresponding to the first information block to a first spatial resource, wherein the first spatial resource belongs to the N spatial resources, and is determined by the network device.

* * * * *